(12) United States Patent
Gao et al.

(10) Patent No.: US 11,656,436 B2
(45) Date of Patent: May 23, 2023

(54) OPTICAL IMAGING SYSTEM

(71) Applicant: Zhejiang Sunny Optical Co., Ltd, Ningbo (CN)

(72) Inventors: Xue Gao, Ningbo (CN); Jianke Wenren, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 321 days.

(21) Appl. No.: 16/937,699

(22) Filed: Jul. 24, 2020

(65) Prior Publication Data

US 2021/0033825 A1   Feb. 4, 2021

(30) Foreign Application Priority Data

Jul. 30, 2019   (CN) .......................... 201910694639.7

(51) Int. Cl.
*G02B 13/00* (2006.01)
*G02B 9/62* (2006.01)
*G02B 13/02* (2006.01)

(52) U.S. Cl.
CPC .......... *G02B 13/0045* (2013.01); *G02B 9/62* (2013.01); *G02B 13/02* (2013.01)

(58) Field of Classification Search
CPC .. G02B 13/02; G02B 13/0045; G02B 15/143; G02B 27/0025; G02B 9/62; G02B 9/64; H04N 5/2254; H04N 5/222

USPC ......... 359/656–658, 708, 713, 749, 756–762
See application file for complete search history.

(56) References Cited

U.S. PATENT DOCUMENTS 8,472,128 B2   6/2013   Huang

FOREIGN PATENT DOCUMENTS

CN          207764462 U   *   8/2018
TW             I642968 B       12/2018

OTHER PUBLICATIONS

Communication dated Sep. 10, 2021 from the Indian Intellectual Property Office in Application No. 202014031684.

* cited by examiner

*Primary Examiner* — Travis S Fissel
(74) *Attorney, Agent, or Firm* — Sughrue Mion, PLLC

(57) ABSTRACT

The present disclosure discloses an optical imaging system including, sequentially from an object side to an image side along an optical axis, a first lens having positive refractive power; a second lens having refractive power; a third lens having negative refractive power; a fourth lens having refractive power with a convex object-side surface and a concave image-side surface; a fifth lens having refractive power; and a sixth lens having negative refractive power. Half of a maximal field-of-view Semi-FOV of the optical imaging system satisfies Semi-FOV<15°. A distance TTL along the optical axis from an object-side surface of the first lens to an imaging plane of the optical imaging system, half of a diagonal length ImgH of an effective pixel area on the imaging plane and an effective focal length f of the optical imaging system satisfy 1.9 mm<TTL*ImgH/f<2.7 mm.

18 Claims, 12 Drawing Sheets

OPTICAL IMAGING SYSTEM

CROSS-REFERENCE TO RELATED APPLICATION

This application claims benefit of priority to Chinese Patent Application No. 201910694639.7 filed on Jul. 30, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including six lenses.

BACKGROUND

In recent years, with the development of science and technology, the market demand for imaging systems suitable for portable electronic products has gradually increased. The rapid development of mobile phone camera modules, especially the popularity of large-sized, high-pixel CMOS chips, has caused mobile phone manufacturers to place more stringent requirements on the image quality of the imaging systems. In addition, as the advent of multi-camera modules, there needs to be a good match between the multiple optical imaging systems in the multi-camera modules. For example, the matching of an optical imaging system with telephoto characteristic and an optical imaging system with wide-angle characteristic may realize zoom imaging, but the demand for miniaturization of the size of the optical imaging system is also more intense.

In order to meet the requirements of miniaturization and imaging requirements, an optical imaging system that may simultaneously satisfy the characteristics of long focal length and high image quality is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having positive refractive power; a second lens having refractive power; a third lens having negative refractive power; a fourth lens having refractive power, an object-side surface thereof may be a convex surface, and an image-side surface thereof may be a concave surface; a fifth lens having refractive power; and a sixth lens having negative refractive power.

In one embodiment, half of a maximal field-of-view Semi-FOV of the optical imaging system may satisfy Semi-FOV<15°.

In one embodiment, a distance TTL along the optical axis from an object-side surface of the first lens to an imaging plane of the optical imaging system, half of a diagonal length ImgH of an effective pixel area on the imaging plane and an effective focal length f of the optical imaging system may satisfy 1.9 mm<TTL*ImgH/f<2.7 mm.

In one embodiment, a distance TTL along the optical axis from an object-side surface of the first lens to an imaging plane of the optical imaging system may satisfy 10 mm<TTL<15 mm.

In one embodiment, a distance TTL along the optical axis from an object-side surface of the first lens to an imaging plane of the optical imaging system and an effective focal length f of the optical imaging system may satisfy TTL/f<0.9.

In one embodiment, an effective focal length f of the optical imaging system, an effective focal length f1 of the first lens and an effective focal length f3 of the third lens may satisfy 0.8<f/(f1−f3)<1.2.

In one embodiment, a radius of curvature R11 of an object-side surface of the sixth lens, a radius of curvature R12 of an image-side surface of the sixth lens and an effective focal length f6 of the sixth lens may satisfy −1.5<(R11+R12)/f6<−0.2.

In one embodiment, a radius of curvature R7 of the object-side surface of the fourth lens, a radius of curvature R8 of the image-side surface of the fourth lens and an effective focal length f of the optical imaging system may satisfy 0.4<(R7+R8)/f<0.8.

In one embodiment, a radius of curvature R1 of an object-side surface of the first lens, a radius of curvature R6 of an image-side surface of the third lens and a radius of curvature R3 of an object-side surface of the second lens may satisfy 0.3<(R1+R6)/R3<1.0.

In one embodiment, a center thickness CT1 of the first lens along the optical axis, a spaced interval T45 between the fourth lens and the fifth lens along the optical axis and a distance TTL along the optical axis from an object-side surface of the first lens to an imaging plane of the optical imaging system may satisfy 1.7<(CT1+T45)/TTL*5<2.2.

In one embodiment, a combined focal length f234 of the second lens, the third lens and the fourth lens, a combined focal length f56 of the fifth lens and the sixth lens and an effective focal length f of the optical imaging system may satisfy 1.0<(f234−f56)/f<1.8.

In one embodiment, half of an effective aperture DT11 of an object-side surface of the first lens, half of an effective aperture DT61 of an object-side surface of the sixth lens and half of a diagonal length ImgH of an effective pixel area on an imaging plane of the optical imaging system may satisfy 1.2<(DT11+DT61)/ImgH<1.5.

In one embodiment, an on-axis distance SAG41 from an intersection of the object-side surface of the fourth lens and the optical axis to a vertex of an effective radius of the object-side surface of the fourth lens and an on-axis distance SAG61 from an intersection of an object-side surface of the sixth lens and the optical axis to a vertex of an effective radius of the object-side surface of the sixth lens may satisfy −1.8<SAG41/SAG61<−1.1.

The present disclosure employs six lenses, and the optical imaging system has at least one advantageous effect such as miniaturization, long focal length and high image quality and the like by rationally matching the lenses of different materials and rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
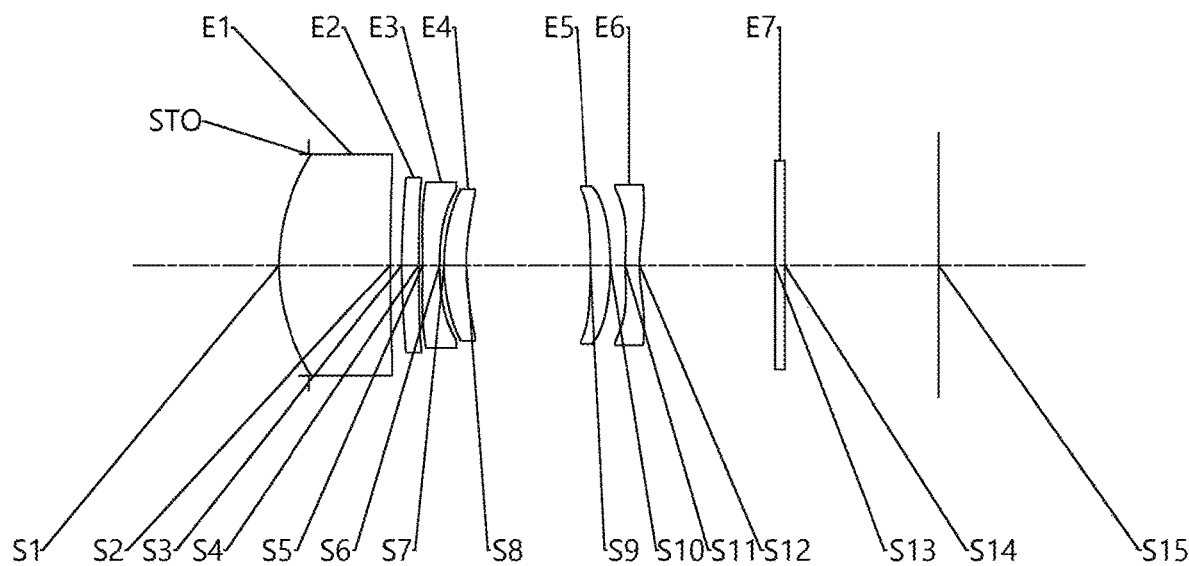
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, six lenses having refractive power, that is, a first lens, a second lens, a third lens, a fourth lens, a fifth lens and a sixth lens. The six lenses are arranged sequentially from an object side to an image side along an optical axis. Among the first lens to the sixth lens, there may be an air interval between each two adjacent lenses.

In an exemplary embodiment, the first lens may have positive refractive power; the second lens has positive or negative refractive power; the third lens may have negative refractive power; the fourth lens has positive or negative refractive power, an object-side surface thereof may be a convex surface, and an image-side surface thereof may be a concave surface; the fifth lens has positive or negative refractive power; and the sixth lens may have negative refractive power. By reasonably controlling the positive and negative refractive power of each component of the system and the curvature of each lens's surface, the low-order aberration of the system may be effectively compensated. The first lens with positive refractive power, the third lens with negative refractive power and the sixth lens with negative refractive power are beneficial to control the deflection of the light within the effective area of the optical imaging system, and thus the on-axis spherical aberration and off-axis coma of the optical imaging system are better compensated.

In an exemplary embodiment, the optical imaging system according to the present disclosure may satisfy: Semi-FOV<15°, where Semi-FOV is half of a maximal field-of-view of the optical imaging system. More specifically, Semi-FOV may satisfy: 9°<Semi-FOV<10.5°. Controlling half of the maximal field-of-view of the optical imaging system may control the optical imaging system to have an imaging range capable of receiving sufficient information while allowing the optical imaging system to have good image quality.

In an exemplary embodiment, the optical imaging system according to the present disclosure may satisfy: 1.9 mm<TTL*ImgH/f<2.7 mm, where TTL is a distance along the optical axis from an object-side surface of the first lens to an imaging plane of the optical imaging system, ImgH is half of a diagonal length of an effective pixel area on the imaging plane and f is an effective focal length of the optical imaging system. More specifically, TTL, ImgH and f may satisfy: 2.35 mm<TTL×ImgH/f<2.53 mm. By controlling the total track length, half image height, and effective focal length of the optical imaging system, the structure of the optical imaging system may be compacted, and the length of the optical imaging system may be effectively shortened, so that the optical imaging system has the characteristics of miniaturization.

In an exemplary embodiment, the optical imaging system according to the present disclosure may satisfy: 10 mm<TTL<15 mm, where TTL is a distance along the optical axis from an object-side surface of the first lens to an imaging plane of the optical imaging system. More specifically, TTL may satisfy: 13.5 mm<TTL<13.8 mm. Controlling the optical length of the optical imaging system may allow the optical imaging system to have a longer focal length and better image quality while being miniaturized. The device provided with the optical imaging system, such as a mobile phone, may have a thinner size.

In an exemplary embodiment, the optical imaging system according to the present disclosure may satisfy: TTL/f<0.9, where TTL is a distance along the optical axis from an object-side surface of the first lens to an imaging plane of the optical imaging system and f is an effective focal length of the optical imaging system. More specifically, TTL and f may satisfy: 0.8<TTL/f<0.9. By controlling the ratio of the optical length of the optical imaging system to the effective focal length of the optical imaging system, the optical imaging system may be miniaturized while having a long focal length.

In an exemplary embodiment, the optical imaging system according to the present disclosure may satisfy: 0.8<f/(f1-f3)<1.2, where f is an effective focal length of the optical imaging system, f1 is an effective focal length of the first lens and f3 is an effective focal length of the third lens. More specifically, f, f1 and f3 may satisfy: 0.9<f/(f1-f3)<1.1. By controlling the optical imaging system to meet the aforementioned conditional formula and matching the refractive power of each lens, the astigmatic and distortion of the optical imaging system may be effectively compensated, thereby improving the Modulation Transfer Function (MTF) of each field-of-view of the optical imaging system on the optical axis.

In an exemplary embodiment, the optical imaging system according to the present disclosure may satisfy: −1.5<(R11+R12)/f6<−0.2, where R11 is a radius of curvature of an object-side surface of the sixth lens, R12 is a radius of curvature of an image-side surface of the sixth lens and f6 is an effective focal length of the sixth lens. More specifically, R11, R12 and f6 may satisfy: −1.48<(R11+R12)/f6<−0.22. By controlling the radius of curvature of the two surfaces of the sixth lens and the effective focal length of the sixth lens, the refractive power of the sixth lens may be effectively controlled, so that the ability of the sixth lens to deflect light is improved, thereby reducing the sensitivity of the optical imaging system, and making the optical imaging system more workable.

In an exemplary embodiment, the optical imaging system according to the present disclosure may satisfy: 0.4<(R7+R8)/f<0.8, where R7 is a radius of curvature of the object-side surface of the fourth lens, R8 is a radius of curvature of the image-side surface of the fourth lens and f is an effective focal length of the optical imaging system. More specifically, R7, R8 and f may satisfy: 0.50<(R7+R8)/f<0.64. By controlling the ratio of the sum of the curvature radii of the two surfaces of the fourth lens to the focal length of the optical imaging system, the curvature radii of the two surfaces of the fourth lens are matched, and the chief ray angle of the optical imaging system is suitably matched with the photosensitive chip, thereby improving the image quality of the optical imaging system.

In an exemplary embodiment, the optical imaging system according to the present disclosure may satisfy: 0.3<(R1+R6)/R3<1.0, where R1 is a radius of curvature of an object-side surface of the first lens, R6 is a radius of curvature of an image-side surface of the third lens and R3 is a radius of curvature of an object-side surface of the second lens. More specifically, R1, R6 and R3 may satisfy: 0.32<(R1+R6)/R3<0.98. By controlling the radius of curvature of the object-side surface of the first lens, the radius of curvature of the object-side surface of the second lens, and the radius of curvature of the image-side surface of the second lens, the chromatic aberration and distortion of the optical imaging system may be effectively improved, the incident angle of the edge light may be reduced, and the optical imaging system has good manufacturability, thereby improving the processing yield of the optical imaging system.

In an exemplary embodiment, the optical imaging system according to the present disclosure may satisfy: 1.7<(CT1+T45)/TTL*5<2.2, where CT1 is a center thickness of the first lens along the optical axis, T45 is a spaced interval between the fourth lens and the fifth lens along the optical axis and TTL is a distance along the optical axis from an object-side surface of the first lens to an imaging plane of the optical imaging system. More specifically, CT1, T45 and TTL may satisfy: 1.75<(CT1+T45)/TTL*5<2.10. By controlling the center thickness of the first lens, the distance between the fourth lens and the fifth lens, and the total track length of the optical imaging system, the center thickness of each lens is reasonable, so that the deflection of the light is alleviated, which reduces the sensitivity of the lens. At the same time, the astigmatic, distortion and chromatic aberration of the optical imaging system are reduced, and the optical imaging system has the characteristics of miniaturization.

In an exemplary embodiment, the optical imaging system according to the present disclosure may satisfy: $1.0<(f234-f56)/f<1.8$, where f234 is a combined focal length of the second lens, the third lens and the fourth lens, f56 is a combined focal length of the fifth lens and the sixth lens and f is an effective focal length of the optical imaging system. More specifically, f234, f56 and f may satisfy: $1.05<(f234-f56)/f<1.78$. By controlling the focal length of each lens among the second lens to the sixth lens and the effective focal length of the optical imaging system, the contribution of each lens to the field curvature may be controlled, and the field curvature contributed by each lens may be offset with each other, so that the optical imaging system has good image quality.

In an exemplary embodiment, the optical imaging system according to the present disclosure may satisfy: $1.2<(DT11+DT61)/ImgH<1.5$, where DT11 is half of an effective aperture of an object-side surface of the first lens, DT61 is half of an effective aperture of an object-side surface of the sixth lens and ImgH is half of a diagonal length of an effective pixel area on an imaging plane of the optical imaging system. More specifically, DT11, DT61 and ImgH may satisfy: $1.35<(DT11+DT61)/ImgH<1.45$. Controlling the ratio of the sum of half effective aperture of the object-side surface of the first lens and half effective aperture of the object-side surface of the sixth lens to the half image height of the optical imaging system may effectively reduce the incident angle of the edge ray, so that the optical imaging system has good tolerance.

In an exemplary embodiment, the optical imaging system according to the present disclosure may satisfy: $-1.8<SAG41/SAG61<-1.1$, where SAG41 is an on-axis distance from an intersection of the object-side surface of the fourth lens and the optical axis to a vertex of an effective radius of the object-side surface of the fourth lens and SAG61 is an on-axis distance from an intersection of an object-side surface of the sixth lens and the optical axis to a vertex of an effective radius of the object-side surface of the sixth lens. More specifically, SAG41 and SAG61 may satisfy: $-1.78<SAG41/SAG61<-1.13$. By controlling the ratio of the sagittal height of the object-side surface of the fourth lens to the sagittal height of the object-side surface of the sixth lens, the chief ray angle of the optical imaging system may be adjusted, so that the optical imaging system and the photosensitive chip are better matched, and the relative illuminance of the optical imaging system and the image surface clarity are improved, thereby making the optical imaging system have good image quality.

In an exemplary embodiment, the optical imaging system described above may further include at least one stop. The stop may be disposed at an appropriate position as needed, for example, between the object side and the first lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as six lenses as described above. By properly assigning the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as long focal length, miniaturization, and high image quality.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking six lenses as an example, the optical imaging system is not limited to include six lenses. The optical imaging system may also include other numbers of lenses if desired.

In an exemplary embodiment, the optical imaging system provided by the present disclosure may also be a periscope optical imaging system. The periscope optical imaging system further includes at least one reflective element, and the reflective element may be a reflective flat mirror or a prism. By turning the light via the reflective element, the periscope optical imaging system may have a shorter size in the direction of the incident light on the object side. The periscope optical imaging system may be applied to thinner portable devices such as mobile phones.

As an example, the periscope optical imaging system includes a prism disposed between the object side and the first lens, and the angle between the reflection surface of the prism and the optical axis is in the range of 0° to 90°, such as 45°.

In an exemplary embodiment, the optical imaging system provided by the present disclosure may also be a multi-camera imaging system, which includes the aforementioned periscope optical imaging system and a wide-angle imaging system. The multi-camera imaging system may achieve 5× to 10× zoom imaging.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

Table 1 is a table illustrating basic parameters of the optical imaging system of example 1, wherein the units for the radius of curvature, the thickness/distance and the focal length are millimeter (mm).

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.6216 | | | | |
| S1 | aspheric | 4.1386 | 2.3000 | 1.55 | 55.9 | 8.04 | 0.0794 |
| S2 | aspheric | 52.8975 | 0.2367 | | | | 98.7149 |
| S3 | aspheric | 15.8625 | 0.3500 | 1.55 | 55.9 | 35.70 | −75.0322 |
| S4 | aspheric | 82.1579 | 0.0800 | | | | 99.0000 |
| S5 | aspheric | −21.1661 | 0.3469 | 1.65 | 23.5 | −7.17 | 8.1922 |
| S6 | aspheric | 5.9590 | 0.0912 | | | | −0.0478 |
| S7 | aspheric | 3.7204 | 0.4568 | 1.55 | 55.9 | 28.19 | 0.1563 |
| S8 | aspheric | 4.6831 | 2.5660 | | | | −0.4184 |
| S9 | aspheric | −14.1892 | 0.4090 | 1.67 | 20.4 | 14.24 | 1.3401 |
| S10 | aspheric | −5.7572 | 0.3092 | | | | 0.8949 |
| S11 | aspheric | 6.5838 | 0.2922 | 1.55 | 55.9 | −9.63 | −5.6597 |
| S12 | aspheric | 2.8880 | 2.7866 | | | | −0.2044 |
| S13 | spherical | infinite | 0.2000 | 1.52 | 64.2 | | |
| S14 | spherical | infinite | 3.1754 | | | | |
| S15 | spherical | infinite | | | | | |

In example 1, an effective focal length f of the optical imaging system is 15.27 mm, an on-axis distance TTL from the object-side surface S1 of the first lens E1 to the imaging plane S15 is 13.60 mm, and half of a diagonal length ImgH of an effective pixel area on the imaging plane S15 is 2.70 mm.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 |
|---|---|---|---|---|---|
| S1 | −5.2000E−04 | −2.4000E−04 | 2.2400E−04 | −1.3000E−04 | 4.4400E−05 |
| S2 | 3.2730E−03 | −1.5740E−02 | 2.4298E−02 | −1.8320E−02 | 7.2420E−03 |

TABLE 2-continued

| | | | | | |
|---|---|---|---|---|---|
| S3 | 1.3677E−02 | 4.7410E−02 | 6.3315E−02 | −3.2990E−02 | −2.9700E−03 |
| S4 | −1.3800E−03 | 7.2800E−03 | −2.9720E−02 | 7.9079E−02 | −9.8870E−02 |
| S5 | 2.9350E−03 | 8.1662E−02 | −1.5588E−01 | 1.7702E−01 | −1.3484E−01 |
| S6 | 6.5800E−04 | 1.0460E−01 | −1.8002E−01 | 1.8373E−01 | −1.3080E−01 |
| S7 | −2.7470E−02 | 5.8719E−02 | −8.2370E−02 | 8.7890E−02 | −7.6430E−02 |
| S8 | −1.5710E−02 | −8.5000E−05 | 4.1300E−04 | 9.3500E−03 | −1.9270E−02 |
| S9 | 3.3200E−03 | −1.3500E−02 | 9.5470E−03 | −1.1860E−02 | 9.3020E−03 |
| S10 | −4.3900E−03 | −2.5000E−03 | 1.7900E−04 | −6.9700E−03 | 8.0910E−03 |
| S11 | −1.4093E−01 | 7.3546E−02 | −2.8760E−02 | −5.0500E−03 | 1.6938E−02 |
| S12 | −1.4579E−01 | 8.5442E−02 | −4.7890E−02 | 1.9792E−02 | −3.9800E−03 |

| Surface number | A14 | A16 | A18 | A20 |
|---|---|---|---|---|
| S1 | −1.0000E−05 | 1.6500E−06 | −1.6000E−07 | 6.5458E−09 |
| S2 | −1.3500E−03 | 3.2100E−05 | 2.4800E−05 | −2.5700E−06 |
| S3 | 1.1071E−02 | −5.0200E−03 | 9.7300E−04 | −7.1740E−05 |
| S4 | 6.5306E−02 | −2.3690E−02 | 4.4710E−03 | −3.4378E−04 |
| S5 | 6.8291E−02 | −2.1710E−02 | 3.8730E−03 | −2.9391E−04 |
| S6 | 6.7541E−02 | −2.3780E−02 | 4.9420E−03 | −4.4626E−04 |
| S7 | 4.9132E−02 | −1.9970E−02 | 4.4320E−03 | −4.0503E−04 |
| S8 | 1.7309E−02 | −8.0200E−03 | 1.8690E−03 | −1.7268E−04 |
| S9 | −4.5000E−03 | 1.3450E−03 | −2.4000E−04 | 2.1477E−05 |
| S10 | −4.3700E−03 | 1.2810E−03 | −2.0000E−04 | 1.4151E−05 |
| S11 | −1.1450E−02 | 3.9350E−03 | −7.1000E−04 | 5.2359E−05 |
| S12 | −6.8000E−04 | 6.2700E−04 | −1.5000E−04 | 1.2245E−05 |

Figure 2A:
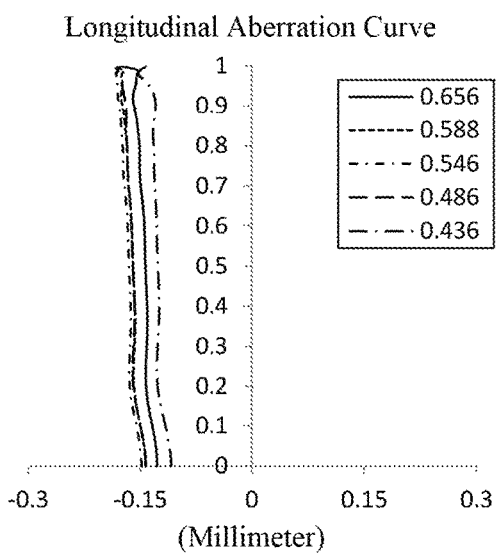
FIGS. 2A to 2D illustrate a longitudinal aberration curve, an astigmatic curve, a distortion curve, and a lateral color curve of the optical imaging system of the Example 1, respectively.
Figure 2B:
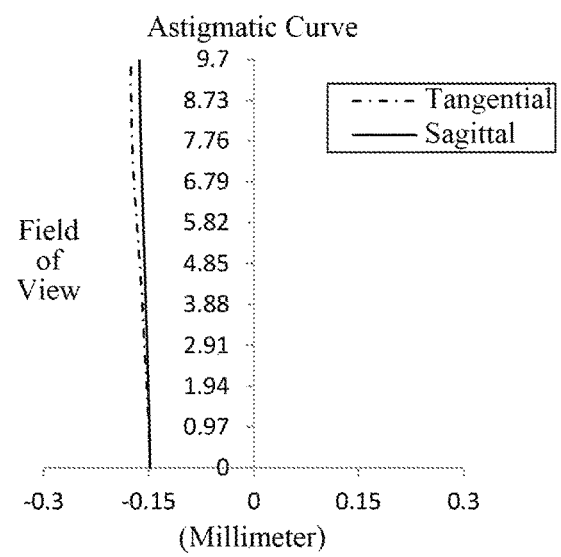
Figure 2C:
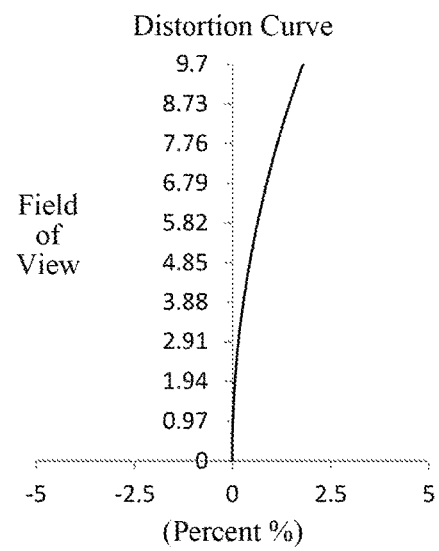
Figure 2D:
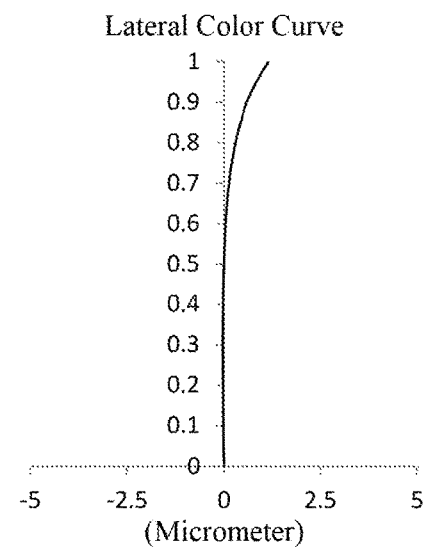

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different field-of-views. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve good image quality.

Example 2

Figure 3:
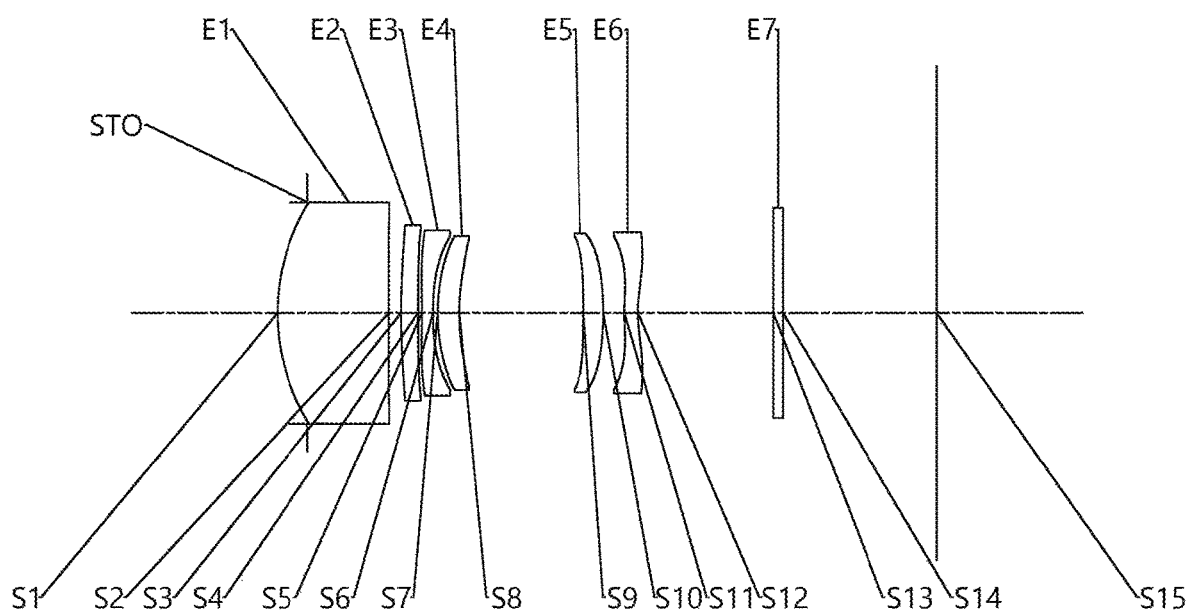
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 2, an effective focal length f of the optical imaging system is 15.27 mm, an on-axis distance TTL from the object-side surface S1 of the first lens E1 to the imaging plane S15 is 13.60 mm, and half of a diagonal length ImgH of an effective pixel area on the imaging plane S15 is 2.72 mm.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | infinite | | | | |
| STO | spherical | infinite | −0.6216 | | | | |

TABLE 3-continued

| Surface number | Surface type | Radius of curvature | Thickness/ Distance | Material Refractive index | Abbe number | Focal length | Conic coefficient |
|---|---|---|---|---|---|---|---|
| S1 | aspheric | 4.2322 | 2.3000 | 1.55 | 55.9 | 7.70 | 0.0829 |
| S2 | aspheric | −66755.8000 | 0.2525 | | | | 99.0000 |
| S3 | aspheric | 16.3429 | 0.3500 | 1.55 | 55.9 | 37.24 | −77.2613 |
| S4 | aspheric | 80.5481 | 0.0800 | | | | 99.0000 |
| S5 | aspheric | −19.8009 | 0.2282 | 1.65 | 23.5 | −7.17 | 1.4026 |
| S6 | aspheric | 6.0651 | 0.0946 | | | | −0.3578 |
| S7 | aspheric | 3.8233 | 0.4451 | 1.55 | 55.9 | 36.16 | 0.1865 |
| S8 | aspheric | 4.5387 | 2.5660 | | | | −0.4376 |
| S9 | aspheric | −17.8026 | 0.4088 | 1.67 | 20.4 | 14.39 | 14.4300 |
| S10 | aspheric | −6.2976 | 0.4350 | | | | 1.5314 |
| S11 | aspheric | 6.1728 | 0.2800 | 1.55 | 55.9 | −9.83 | −7.7071 |
| S12 | aspheric | 2.8352 | 2.7855 | | | | −0.3009 |
| S13 | spherical | infinite | 0.2000 | 1.52 | 64.2 | | |
| S14 | spherical | infinite | 3.1743 | | | | |
| S15 | spherical | infinite | | | | | |

TABLE 4

| Surface number | A4 | A6 | A8 | A10 | A12 |
|---|---|---|---|---|---|
| S1 | −4.9000E−04 | −2.6000E−04 | 2.4900E−04 | −1.5000E−04 | 6.0100E−05 |
| S2 | 3.1590E−03 | −1.2650E−02 | 1.7791E−02 | −1.2820E−02 | 5.0620E−03 |
| S3 | 1.2683E−02 | −3.6590E−02 | 3.9590E−02 | −9.7200E−03 | −1.4940E−02 |
| S4 | −4.0000E−03 | 1.7141E−02 | −5.1060E−02 | 1.0721E−01 | −1.2143E−01 |
| S5 | 1.3970E−03 | 8.7138E−02 | −1.6026E−01 | 1.7783E−01 | −1.3538E−01 |
| S6 | 2.7950E−03 | 8.9502E−02 | −1.4055E−01 | 1.3388E−01 | −9.8140E−02 |
| S7 | −2.4540E−02 | 4.0722E−02 | −4.4790E−02 | 5.2465E−02 | −6.1410E−02 |
| S8 | −1.5210E−02 | 2.9950E−03 | −8.2100E−03 | 2.3397E−02 | −3.3370E−02 |
| S9 | −9.0000E−04 | −7.2800E−03 | 3.8830E−03 | −7.9500E−03 | 7.3740E−03 |
| S10 | −8.8300E−03 | 3.9460E−03 | −6.2700E−03 | −1.2100E−03 | 3.9260E−03 |
| S11 | −1.4663E−01 | 7.9648E−02 | −3.3710E−02 | −1.6300E−03 | 1.4618E−02 |
| S12 | −1.5248E−01 | 9.1531E−02 | −5.2520E−02 | 2.2092E−02 | −4.6400E−03 |

| Surface number | A14 | A16 | A18 | A20 |
|---|---|---|---|---|
| S1 | −1.5000E−05 | 2.5300E−06 | −2.4000E−07 | 9.7733E−09 |
| S2 | −1.0300E−03 | 7.1400E−05 | 6.7900E−06 | −9.8458E−07 |
| S3 | 1.4286E−02 | −5.3700E−03 | 9.6200E−04 | −6.7665E−05 |
| S4 | 7.6426E−02 | −2.6980E−02 | 5.0090E−03 | −3.8100E−04 |
| S5 | 6.9663E−02 | −2.2630E−02 | 4.1240E−03 | −3.1864E−04 |
| S6 | 5.6799E−02 | −2.2520E−02 | 5.0830E−03 | −4.8088E−04 |
| S7 | 4.8224E−02 | −2.1500E−02 | 4.9510E−03 | −4.5793E−04 |
| S8 | 2.5688E−02 | −1.0900E−02 | 2.3990E−03 | −2.1349E−04 |
| S9 | −4.0400E−03 | 1.3990E−03 | −2.9000E−04 | 2.8520E−05 |
| S10 | −2.3900E−03 | 7.4300E−04 | −1.3000E−04 | 1.0194E−05 |
| S11 | −1.0220E−02 | 3.5400E−03 | −6.4000E−04 | 4.8358E−05 |
| S12 | −5.8000E−04 | 6.2400E−04 | −1.5000E−04 | 1.2364E−05 |

Figure 4A:
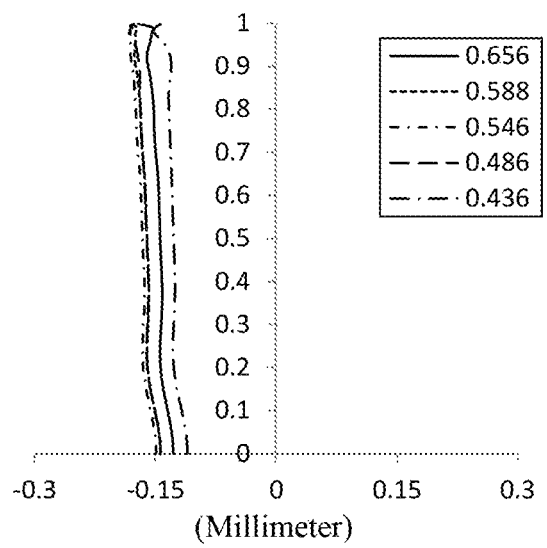
FIGS. 4A to 4D illustrate a longitudinal aberration curve, an astigmatic curve, a distortion curve, and a lateral color curve of the optical imaging system of the Example 2, respectively.
Figure 4B:
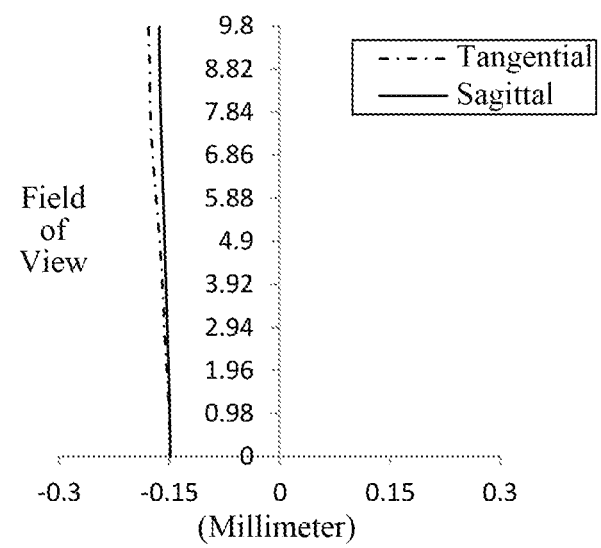
Figure 4C:
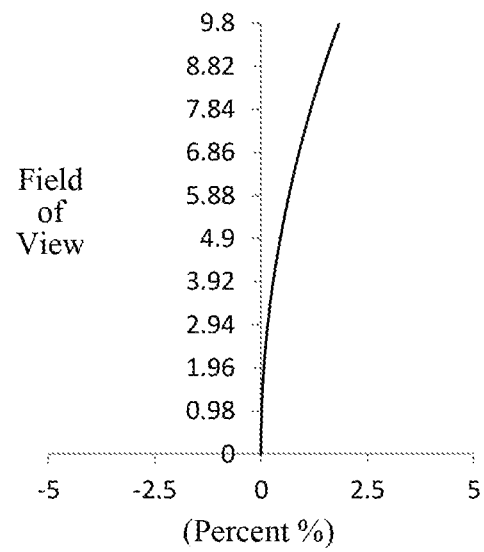
Figure 4D:
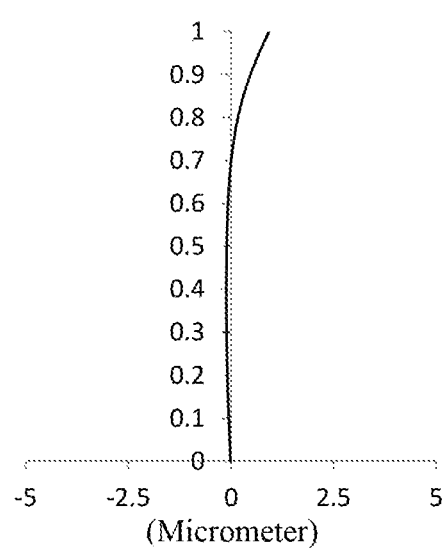

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion at different field-of-views. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve good image quality.

Example 3

Figure 5:
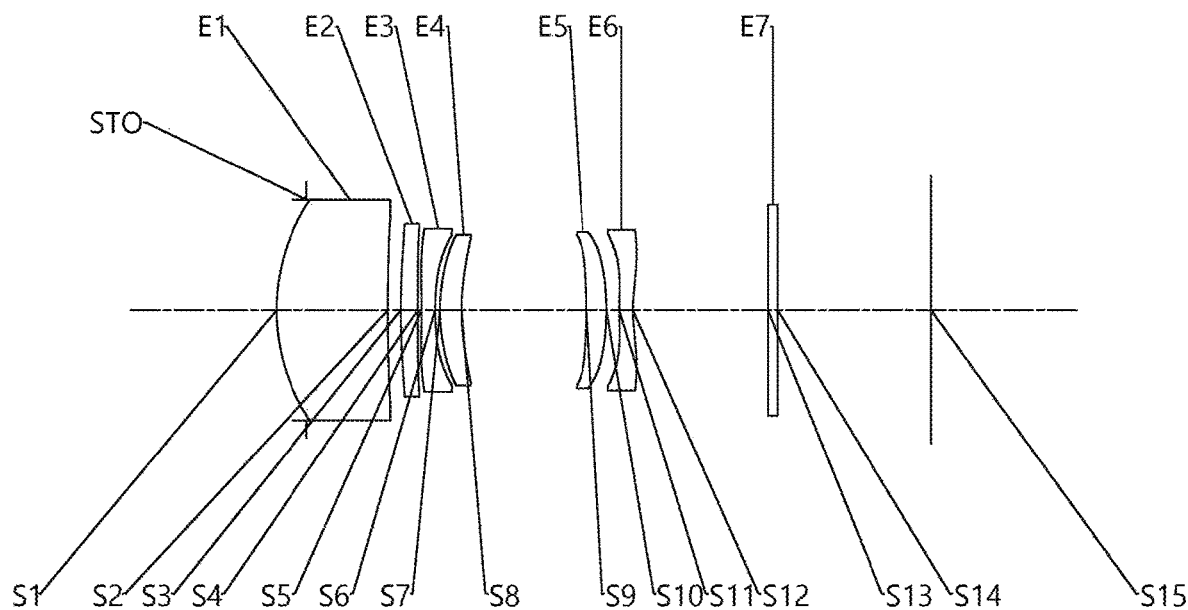
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 3, an effective focal length f of the optical imaging system is 15.26 mm, an on-axis distance TTL from the object-side surface S1 of the first lens E1 to the imaging plane S15 is 13.50 mm, and half of a diagonal length ImgH of an effective pixel area on the imaging plane S15 is 2.75 mm.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.6216 | | | | |
| S1 | aspheric | 4.0456 | 2.3000 | 1.55 | 55.9 | 7.99 | 0.0937 |
| S2 | aspheric | 40.8048 | 0.2650 | | | | 77.6672 |
| S3 | aspheric | 15.1913 | 0.3500 | 1.55 | 55.9 | 27.59 | −78.7210 |
| S4 | aspheric | −8672.5600 | 0.0800 | | | | −99.0829 |
| S5 | aspheric | −19.3970 | 0.2788 | 1.65 | 23.5 | −6.99 | 3.6084 |
| S6 | aspheric | 5.9080 | 0.0992 | | | | 0.0185 |
| S7 | aspheric | 3.7989 | 0.4426 | 1.55 | 55.9 | 33.87 | 0.1939 |
| S8 | aspheric | 4.5759 | 2.5788 | | | | −0.4137 |
| S9 | aspheric | −13.4173 | 0.4132 | 1.67 | 20.4 | 13.69 | 3.8044 |
| S10 | aspheric | −5.5025 | 0.2653 | | | | 0.9352 |
| S11 | aspheric | 7.8402 | 0.2800 | 1.55 | 55.9 | −9.40 | −6.0804 |
| S12 | aspheric | 4.0456 | 2.7789 | | | | −0.1060 |
| S13 | spherical | infinite | 0.2000 | 1.52 | 64.2 | | |
| S14 | spherical | infinite | 3.1682 | | | | |
| S15 | spherical | infinite | | | | | |

TABLE 6

| Surface number | A4 | A6 | A8 | A10 | A12 |
|---|---|---|---|---|---|
| S1 | −4.6000E−04 | −2.4000E−04 | 2.1900E−04 | −1.2000E−04 | 4.0800E−05 |
| S2 | 3.2340E−03 | −1.5210E−02 | 2.3271E−02 | −1.7570E−02 | 6.9400E−03 |
| S3 | 1.5430E−02 | −5.3400E−02 | 7.2252E−02 | −3.8420E−02 | −3.4700E−03 |
| S4 | 1.6850E−03 | −1.2070E−02 | 1.3070E−02 | 3.2872E−02 | −7.2560E−02 |
| S5 | 1.6680E−03 | 8.6437E−02 | −1.5860E−01 | 1.7448E−01 | −1.3230E−01 |
| S6 | 2.8700E−04 | 1.0299E−01 | −1.6745E−01 | 1.6145E−01 | −1.1454E−01 |
| S7 | −2.3610E−02 | 3.3347E−02 | −2.0660E−02 | 1.1209E−02 | −2.3600E−02 |
| S8 | −1.4360E−02 | −6.5600E−03 | 1.5791E−02 | −1.0280E−02 | −5.4100E−03 |
| S9 | 4.2880E−03 | −1.6250E−02 | 1.4765E−02 | −1.8710E−02 | 1.4922E−02 |
| S10 | −3.9500E−03 | −4.9600E−03 | 7.3310E−03 | −1.8000E−02 | 1.7876E−02 |
| S11 | −1.4806E−01 | 8.1047E−02 | −2.7490E−02 | −1.5990E−02 | 2.9832E−02 |
| S12 | −1.5037E−01 | 9.4262E−02 | −5.4810E−02 | 2.2889E−02 | −4.4000E−03 |

| Surface number | A14 | A16 | A18 | A20 |
|---|---|---|---|---|
| S1 | −9.2000E−06 | 1.4100E−06 | −1.3000E−07 | 5.4840E−09 |
| S2 | −1.2600E−03 | 1.0100E−05 | 2.8700E−05 | −2.8788E−06 |
| S3 | 1.3448E−02 | −6.2600E−03 | 1.2450E−03 | −9.4319E−05 |
| S4 | 5.8122E−02 | −2.3340E−02 | 4.7080E−03 | −3.8041E−04 |
| S5 | 6.8587E−02 | −2.2680E−02 | 4.2330E−03 | −3.3600E−04 |
| S6 | 6.3508E−02 | −2.4780E−02 | 5.6510E−03 | −5.4794E−04 |
| S7 | 2.9415E−02 | −1.6670E−02 | 4.4310E−03 | −4.5184E−04 |
| S8 | 1.2038E−02 | −7.1400E−03 | 1.8790E−03 | −1.8686E−04 |
| S9 | −7.3600E−03 | 2.2070E−03 | −3.8000E−04 | 3.1113E−05 |
| S10 | −9.6100E−03 | 2.9580E−03 | −5.0000E−04 | 3.5918E−05 |
| S11 | −1.9440E−02 | 6.7700E−03 | −1.2500E−03 | 9.5971E−05 |
| S12 | −1.0400E−03 | 8.4700E−04 | −2.0000E−04 | 1.6659E−05 |

Figures 6A, 6B:
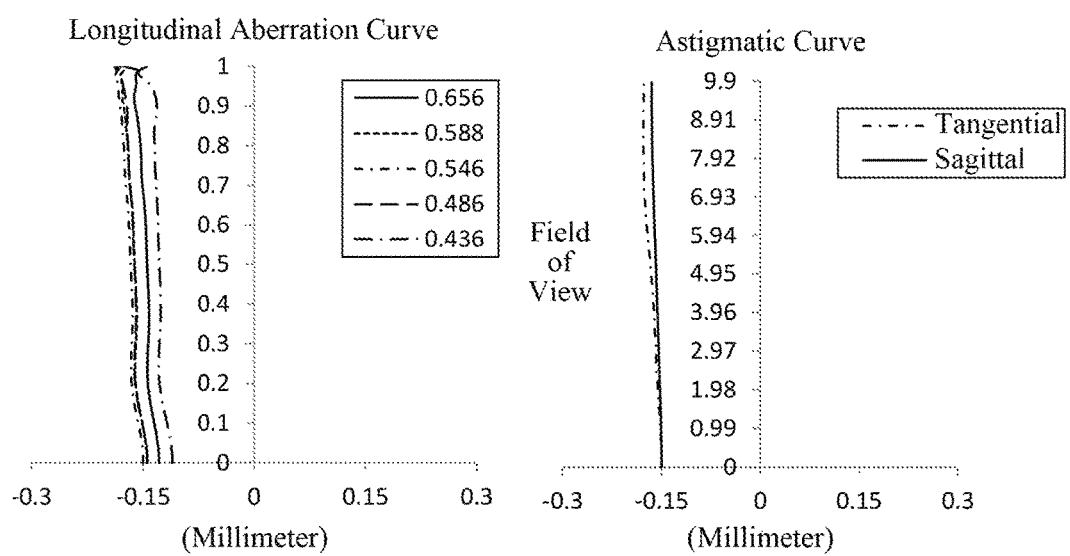
FIGS. 6A to 6D illustrate a longitudinal aberration curve, an astigmatic curve, a distortion curve, and a lateral color curve of the optical imaging system of the Example 3, respectively.
Figure 6C:
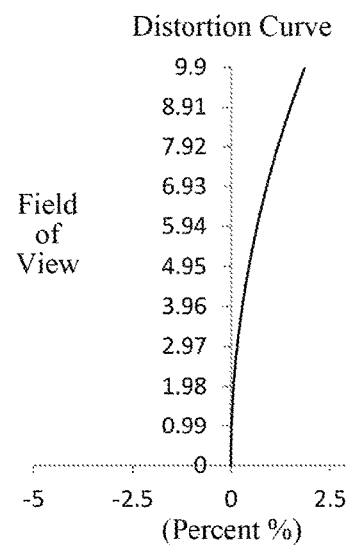
Figure 6D:
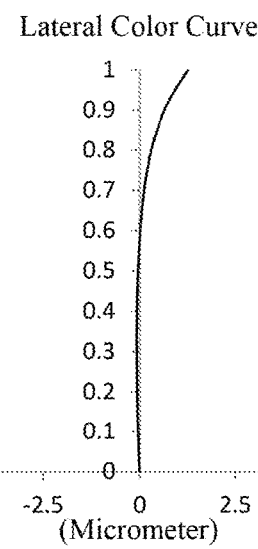

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion at different field-of-views. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve good image quality.

Example 4

Figure 7:
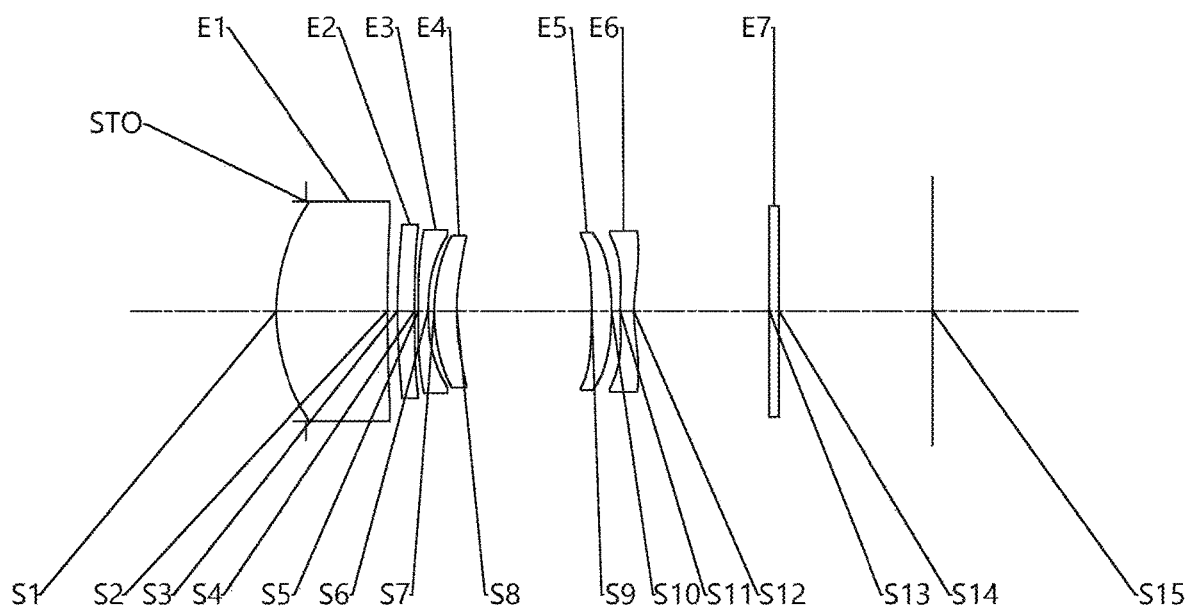
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 4, an effective focal length f of the optical imaging system is 15.34 mm, an on-axis distance TTL from the object-side surface S1 of the first lens E1 to the imaging plane S15 is 13.55 mm, and half of a diagonal length ImgH of an effective pixel area on the imaging plane S15 is 2.76 mm.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.6216 | | | | |
| S1 | aspheric | 4.0377 | 2.3000 | 1.55 | 55.9 | 8.00 | 0.0849 |
| S2 | aspheric | 39.5677 | 0.2079 | | | | 58.1696 |
| S3 | aspheric | 14.3011 | 0.3500 | 1.55 | 55.9 | 44.71 | −57.7358 |
| S4 | aspheric | 33.9202 | 0.0800 | | | | −27.1846 |
| S5 | aspheric | 1000.0000 | 0.2000 | 1.65 | 23.5 | −7.37 | −99.0000 |
| S6 | aspheric | 4.7298 | 0.1263 | | | | −0.7454 |
| S7 | aspheric | 3.6339 | 0.4633 | 1.55 | 55.9 | 25.18 | 0.1007 |
| S8 | aspheric | 4.7054 | 2.7926 | | | | −0.0930 |
| S9 | aspheric | −11.7699 | 0.4088 | 1.67 | 20.4 | 14.44 | 3.9840 |
| S10 | aspheric | −5.3722 | 0.1770 | | | | 0.8994 |
| S11 | aspheric | 6.3687 | 0.2800 | 1.55 | 55.9 | −9.59 | −5.8204 |
| S12 | aspheric | 2.8383 | 2.7877 | | | | −0.2432 |
| S13 | spherical | infinite | 0.2000 | 1.52 | 64.2 | | |
| S14 | spherical | infinite | 3.1764 | | | | |
| S15 | spherical | infinite | | | | | |

TABLE 8

| Surface number | A4 | A6 | A8 | A10 | A12 |
|---|---|---|---|---|---|
| S1 | −4.6840E−04 | −2.5100E−04 | 2.3710E−04 | −1.4300E−04 | 5.4940E−05 |
| S2 | 2.9603E−03 | −1.3097E−02 | 1.6894E−02 | −9.0820E−03 | 8.0390E−04 |
| S3 | 1.1220E−02 | −2.8724E−02 | 1.8359E−02 | 2.2519E−02 | −4.2806E−02 |
| S4 | −7.6488E−03 | 4.1548E−02 | −1.1724E−01 | 1.9867E−01 | −1.9406E−01 |
| S5 | −6.9900E−03 | 1.2409E−01 | −2.5086E−01 | 2.9630E−01 | −2.2669E−01 |
| S6 | −3.3779E−03 | 1.2896E−01 | −2.4930E−01 | 2.9097E−01 | −2.3173E−01 |
| S7 | −2.4786E−02 | 5.9767E−02 | −1.1289E−01 | 1.6238E−01 | −1.6145E−01 |
| S8 | −1.5576E−02 | 8.1921E−03 | −2.4575E−02 | 5.0694E−02 | −6.0244E−02 |
| S9 | 5.8384E−03 | −2.1169E−02 | 2.1142E−02 | −2.3178E−02 | 1.6159E−02 |

TABLE 8-continued

| | | | | | |
|---|---|---|---|---|---|
| S10 | −3.4241E−03 | −1.0103E−02 | 1.9157E−02 | −3.1877E−02 | 2.7143E−02 |
| S11 | −1.4840E−01 | 7.7137E−02 | −1.1816E−02 | −3.7349E−02 | 4.4786E−02 |
| S12 | −1.5274E−01 | 9.3084E−02 | −4.8491E−02 | 1.3908E−02 | 2.3024E−03 |

| Surface number | A14 | A16 | A18 | A20 |
|---|---|---|---|---|
| S1 | −1.4000E−05 | 2.2100E−06 | −2.1000E−07 | 8.2950E−09 |
| S2 | 1.3370E−03 | −6.3000E−04 | 1.1400E−04 | −7.6346E−06 |
| S3 | 2.8327E−02 | −9.4600E−03 | 1.5980E−03 | −1.0877E−04 |
| S4 | 1.1088E−01 | −3.6610E−02 | 6.4700E−03 | −4.7368E−04 |
| S5 | 1.1269E−01 | −3.4850E−02 | 6.0490E−03 | −4.4802E−04 |
| S6 | 1.2636E−01 | −4.4380E−02 | 8.8900E−03 | −7.6327E−04 |
| S7 | 1.0269E−01 | −3.9100E−02 | 8.0640E−03 | −6.9023E−04 |
| S8 | 4.1792E−02 | −1.6660E−02 | 3.5280E−03 | −3.0674E−04 |
| S9 | −6.9000E−03 | 1.7610E−03 | −2.6000E−04 | 1.8251E−05 |
| S10 | −1.3140E−02 | 3.6830E−03 | −5.6000E−04 | 3.6574E−05 |
| S11 | −2.5160E−02 | 7.8570E−03 | −1.3100E−03 | 9.0206E−05 |
| S12 | −3.9800E−03 | 1.6050E−03 | −3.0000E−04 | 2.2487E−05 |

Figure 8A:
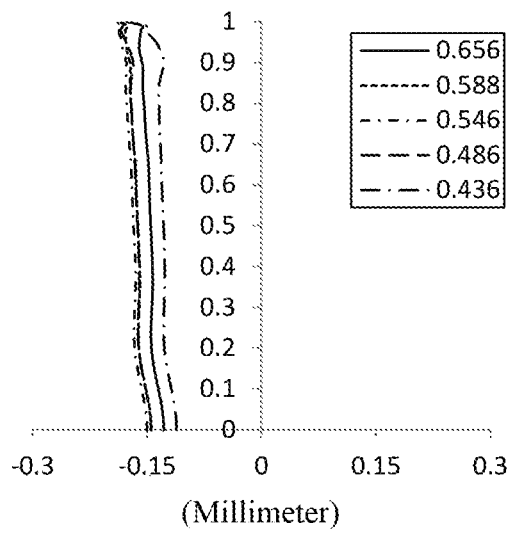
FIGS. 8A to 8D illustrate a longitudinal aberration curve, an astigmatic curve, a distortion curve, and a lateral color curve of the optical imaging system of the Example 4, respectively.
Figure 8B:
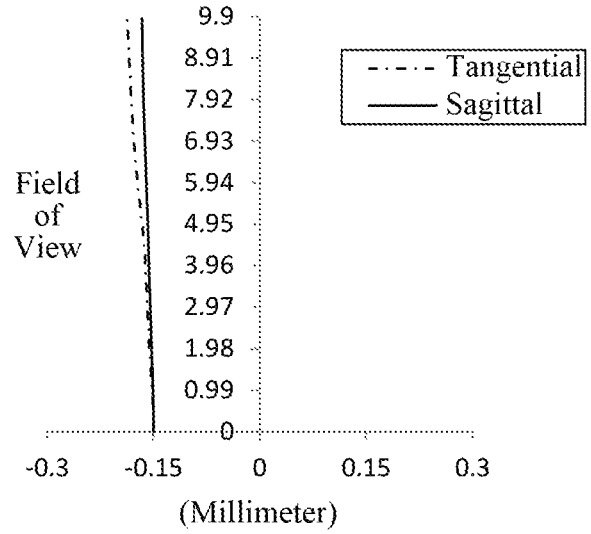
Figure 8C:
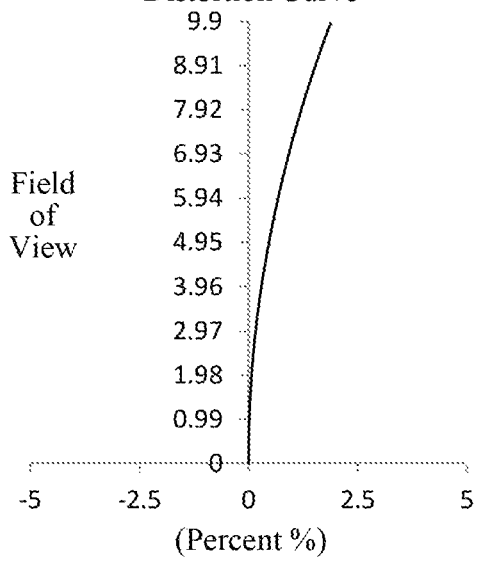
Figure 8D:
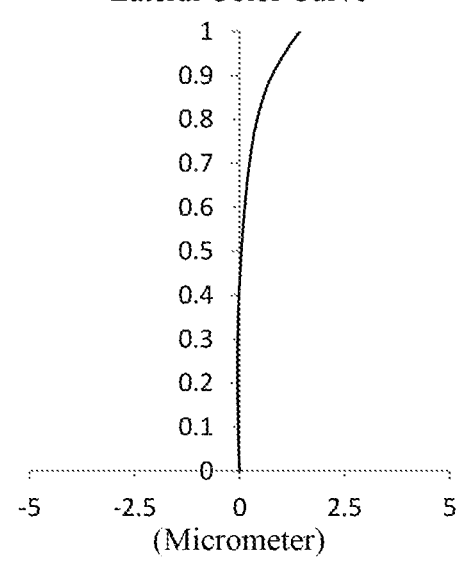

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion at different field-of-views. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve good image quality.

Example 5

Figure 9:
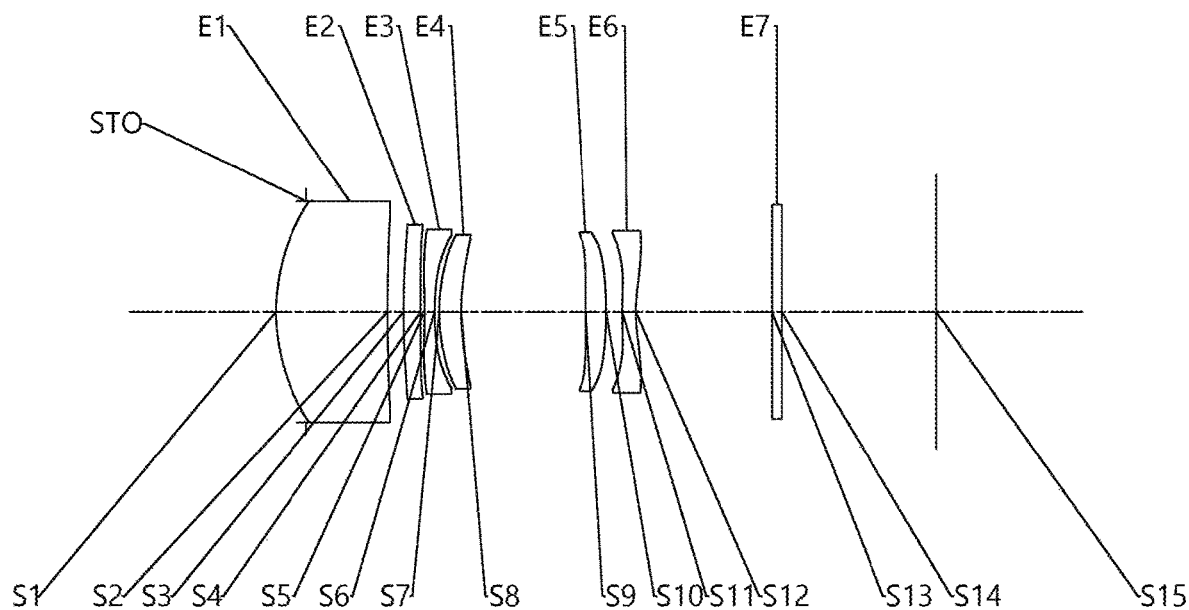
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 5, an effective focal length f of the optical imaging system is 15.31 mm, an on-axis distance TTL from the object-side surface S1 of the first lens E1 to the imaging plane S15 is 13.58 mm, and half of a diagonal length ImgH of an effective pixel area on the imaging plane S15 is 2.81 mm.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | infinite | | | | |
| STO | spherical | infinite | −0.6216 | | | | |
| S1 | aspheric | 4.0770 | 2.3000 | 1.55 | 55.9 | 8.04 | 0.0918 |
| S2 | aspheric | 41.9338 | 0.3272 | | | | 51.5057 |
| S3 | aspheric | 15.8489 | 0.3500 | 1.55 | 55.9 | 30.60 | −75.8567 |
| S4 | aspheric | 273.3886 | 0.0800 | | | | 99.0000 |
| S5 | aspheric | −16.6980 | 0.2072 | 1.65 | 23.5 | −6.86 | 0.0068 |
| S6 | aspheric | 6.0444 | 0.0965 | | | | −0.6947 |
| S7 | aspheric | 3.8565 | 0.4494 | 1.55 | 55.9 | 30.07 | 0.1422 |
| S8 | aspheric | 4.8225 | 2.5660 | | | | −0.1116 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S9 | aspheric | 1000.0000 | 0.4188 | 1.67 | 20.4 | 13.56 | −99.0000 |
| S10 | aspheric | −9.1309 | 0.3300 | | | | 6.0143 |
| S11 | aspheric | 6.6655 | 0.2800 | 1.55 | 55.9 | −9.60 | −1.8900 |
| S12 | aspheric | 2.9003 | 2.7931 | | | | −0.0453 |
| S13 | spherical | infinite | 0.2000 | 1.52 | 64.2 | | |
| S14 | spherical | infinite | 3.1817 | | | | |
| S15 | spherical | infinite | | | | | |

TABLE 10

| Surface No. | A4 | A6 | A8 | A10 | A12 |
|---|---|---|---|---|---|
| S1 | −4.1323E−04 | −2.7100E−04 | 2.6670E−04 | −1.6000E−04 | 6.1700E−05 |
| S2 | 1.1404E−03 | −7.5960E−03 | 1.0963E−02 | −7.1720E−03 | 2.1510E−03 |
| S3 | 1.0515E−02 | −3.0519E−02 | 3.1818E−02 | −2.9540E−03 | −1.9330E−02 |
| S4 | −4.3841E−04 | −4.6000E−04 | −1.0793E−02 | 5.5031E−02 | −8.0810E−02 |
| S5 | 4.1686E−03 | 7.2879E−02 | −1.2612E−01 | 1.3147E−01 | −9.7280E−02 |
| S6 | 2.4412E−03 | 9.1524E−02 | −1.5456E−01 | 1.6522E−01 | −1.3404E−01 |
| S7 | −2.3197E−02 | 4.1848E−02 | −6.5628E−02 | 9.9917E−02 | −1.1501E−01 |
| S8 | −1.3987E−02 | 4.1661E−03 | −1.7082E−02 | 4.1531E−02 | −5.3270E−02 |
| S9 | −2.5386E−03 | −7.3710E−03 | 4.0862E−03 | −7.6900E−03 | 6.8120E−03 |
| S10 | −1.0509E−02 | 4.8068E−03 | −7.2300E−03 | −1.4630E−03 | 5.0610E−03 |
| S11 | −1.3715E−01 | 7.7966E−02 | −3.7639E−02 | 2.9634E−03 | 1.2292E−02 |
| S12 | −1.3876E−01 | 8.4386E−02 | −5.1380E−02 | 2.4317E−02 | −7.0500E−03 |

| Surface No. | A14 | A16 | A18 | A20 |
|---|---|---|---|---|
| S1 | −1.6000E−05 | 2.6100E−06 | −2.5000E−07 | 1.0200E−08 |
| S2 | −1.0000E−04 | −1.0000E−04 | 2.4200E−05 | −1.6899E−06 |
| S3 | 1.6263E−02 | −5.9300E−03 | 1.0490E−03 | −7.3231E−05 |
| S4 | 5.7089E−02 | −2.1470E−02 | 4.1430E−03 | −3.2333E−04 |
| S5 | 5.0490E−02 | −1.6880E−02 | 3.1860E−03 | −2.5457E−04 |
| S6 | 8.0566E−02 | −3.1740E−02 | 7.0270E−03 | −6.5327E−04 |
| S7 | 8.3203E−02 | −3.4840E−02 | 7.7020E−03 | −6.9539E−04 |
| S8 | 3.8803E−02 | −1.6040E−02 | 3.5010E−03 | −3.1272E−04 |
| S9 | −3.4600E−03 | 1.0550E−03 | −1.9000E−04 | 1.6165E−05 |
| S10 | −3.2000E−03 | 9.8900E−04 | −1.6000E−04 | 1.0823E−05 |
| S11 | −9.6600E−03 | 3.5000E−03 | −6.4000E−04 | 4.8641E−05 |
| S12 | 6.2600E−04 | 2.8000E−04 | −9.3000E−05 | 8.7194E−06 |

Figures 10A, 10B:
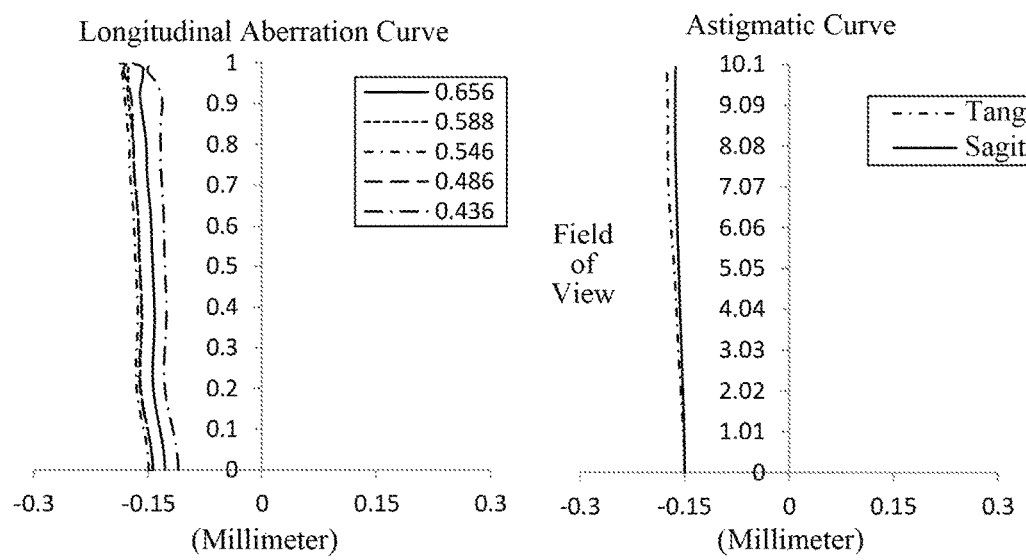
FIGS. 10A to 10D illustrate a longitudinal aberration curve, an astigmatic curve, a distortion curve, and a lateral color curve of the optical imaging system of the Example 5, respectively.
Figure 10C:
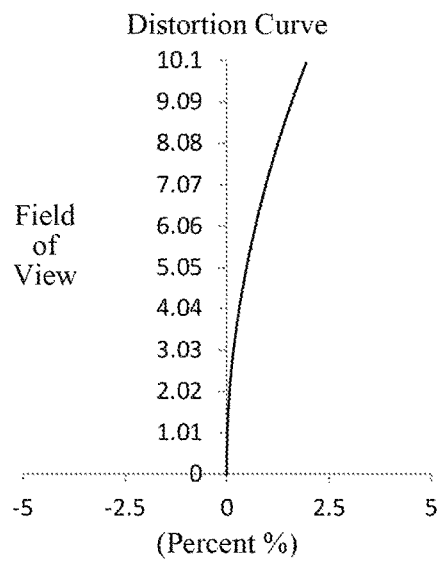
Figure 10D:
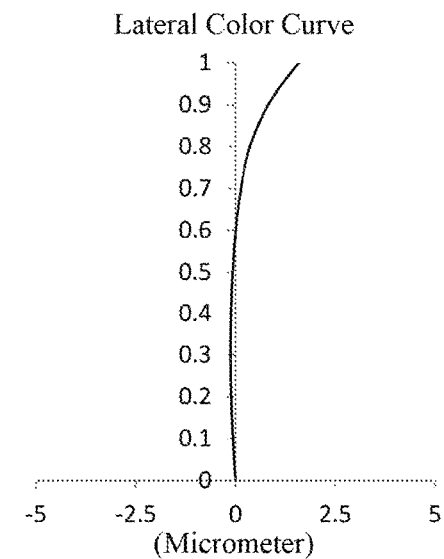

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion at different field-of-views. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve good image quality.

Example 6

Figure 11:
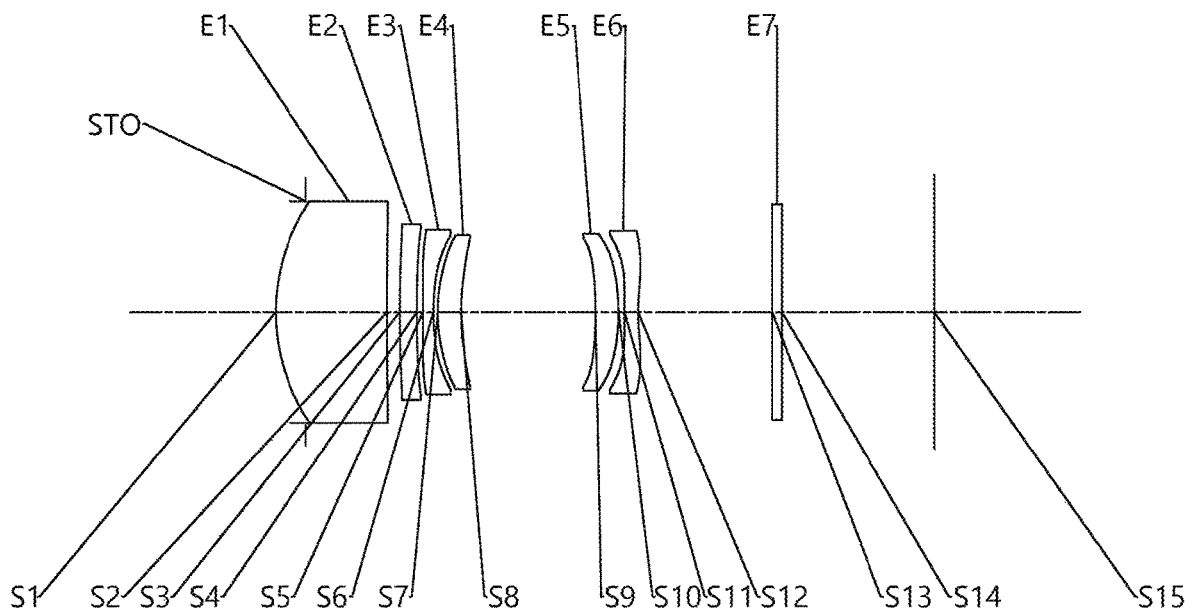
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 6, an effective focal length f of the optical imaging system is 15.36 mm, an on-axis distance TTL from the object-side surface S1 of the first lens E1 to the imaging plane S15 is 13.59 mm, and half of a diagonal length ImgH of an effective pixel area on the imaging plane S15 is 2.80 mm.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.6216 | | | | |
| S1 | aspheric | 3.9764 | 2.3000 | 1.55 | 55.9 | 7.35 | 0.0791 |
| S2 | aspheric | 202.5237 | 0.2633 | | | | −99.0000 |
| S3 | aspheric | 29.1344 | 0.3500 | 1.55 | 55.9 | −23001.19 | −75.0965 |
| S4 | aspheric | 28.9435 | 0.1273 | | | | 37.5651 |
| S5 | aspheric | −23.4619 | 0.2141 | 1.65 | 23.5 | −7.21 | 20.2240 |
| S6 | aspheric | 5.8221 | 0.0900 | | | | −0.7549 |
| S7 | aspheric | 3.5297 | 0.4790 | 1.55 | 55.9 | 20.02 | −0.0740 |
| S8 | aspheric | 4.9473 | 2.7815 | | | | −0.1000 |
| S9 | aspheric | −8.7763 | 0.4715 | 1.67 | 20.4 | 13.94 | 12.8915 |
| S10 | aspheric | −4.6145 | 0.1227 | | | | 0.6300 |
| S11 | aspheric | 10.7625 | 0.2800 | 1.55 | 55.9 | −9.70 | −15.8883 |
| S12 | aspheric | 3.5315 | 2.7611 | | | | −0.1509 |
| S13 | spherical | infinite | 0.2000 | 1.52 | 64.2 | | |
| S14 | spherical | infinite | 3.1496 | | | | |
| S15 | spherical | infinite | | | | | |

TABLE 12

| Surface number | A4 | A6 | A8 | A10 | A12 |
|---|---|---|---|---|---|
| S1 | −4.3807E−04 | −4.3900E−04 | 5.4330E−04 | −4.0000E−04 | 1.7900E−04 |
| S2 | 4.6226E−04 | −3.4360E−03 | 4.4073E−03 | −2.3700E−03 | 4.7300E−04 |
| S3 | 4.3118E−03 | −5.4530E−03 | −5.6100E−03 | 2.0978E−02 | −2.2580E−02 |
| S4 | −7.5447E−03 | 2.9484E−02 | −6.0557E−02 | 9.1772E−02 | −8.8870E−02 |
| S5 | 5.1427E−03 | 5.5145E−02 | −7.8001E−02 | 6.7247E−02 | −4.7230E−02 |
| S6 | 5.5074E−03 | 7.4528E−02 | −1.1603E−01 | 1.2107E−01 | −1.0620E−01 |
| S7 | −2.4552E−02 | 6.0167E−02 | −1.1643E−01 | 1.6715E−01 | −1.6578E−01 |
| S8 | −1.4486E−02 | 1.2720E−02 | −3.9483E−02 | 7.0283E−02 | −7.3990E−02 |
| S9 | 3.9202E−03 | −1.2126E−02 | −1.5940E−03 | 1.1403E−02 | −1.7370E−02 |
| S10 | −6.0639E−03 | −1.0980E−03 | 1.6815E−03 | −9.6400E−03 | 7.6140E−03 |
| S11 | −1.5155E−01 | 7.8091E−02 | −1.0599E−01 | −3.8530E−02 | 4.2218E−02 |
| S12 | −1.5136E−01 | 9.1076E−02 | −4.5318E−02 | 1.1596E−02 | 2.6770E−03 |

| Surface number | A14 | A16 | A18 | A20 |
|---|---|---|---|---|
| S1 | −5.0000E−05 | 8.3600E−06 | −7.8000E−07 | 3.0453E−08 |
| S2 | 6.6100E−05 | −4.3000E−05 | 5.6500E−06 | −1.6509E−07 |
| S3 | 1.2281E−02 | −3.6500E−03 | 5.6200E−04 | −3.5086E−05 |
| S4 | 5.1923E−02 | −1.7620E−02 | 3.1910E−03 | −2.3817E−04 |
| S5 | 2.6513E−02 | −9.9000E−03 | 2.0490E−03 | −1.7507E−04 |
| S6 | 7.1072E−02 | −3.0300E−02 | 7.0410E−03 | −6.7307E−04 |
| S7 | 1.0600E−01 | −4.0820E−02 | 8.5430E−03 | −7.4329E−04 |
| S8 | 4.7190E−02 | −1.7770E−02 | 3.6160E−03 | −3.0518E−04 |
| S9 | 1.3951E−02 | −6.2000E−03 | 1.4190E−03 | −1.2828E−04 |
| S10 | −1.4300E−03 | −7.5000E−04 | 3.6800E−04 | −4.4353E−05 |
| S11 | −2.0610E−02 | 5.0630E−03 | −5.4000E−04 | 9.4370E−06 |
| S12 | −3.4300E−03 | 1.2180E−03 | −2.0000E−04 | 1.2900E−05 |

Figure 12A:
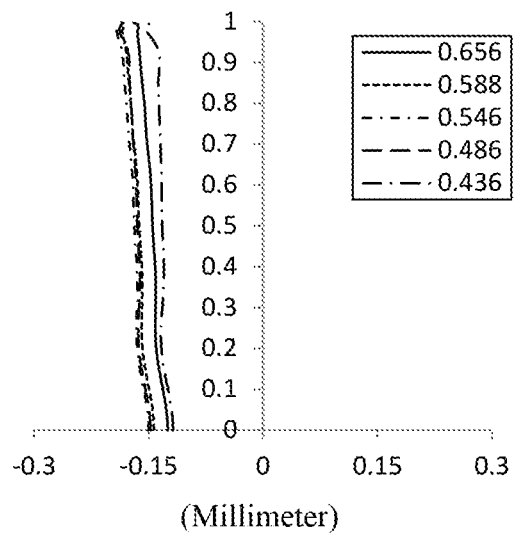
FIGS. 12A to 12D illustrate a longitudinal aberration curve, an astigmatic curve, a distortion curve, and a lateral color curve of the optical imaging system of the Example 6, respectively.
Figure 12B:
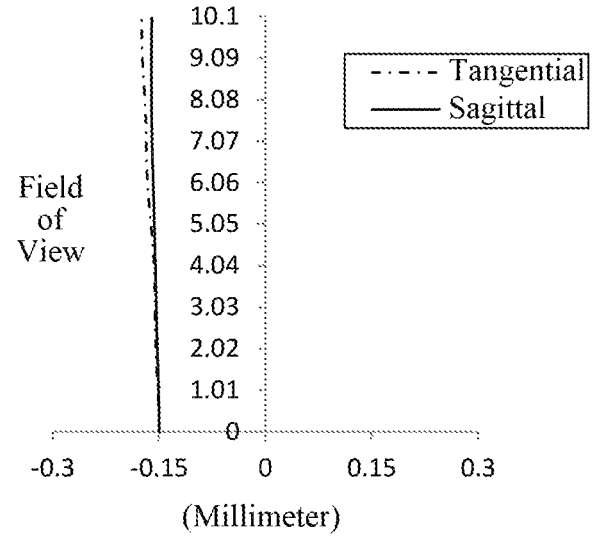
Figure 12C:
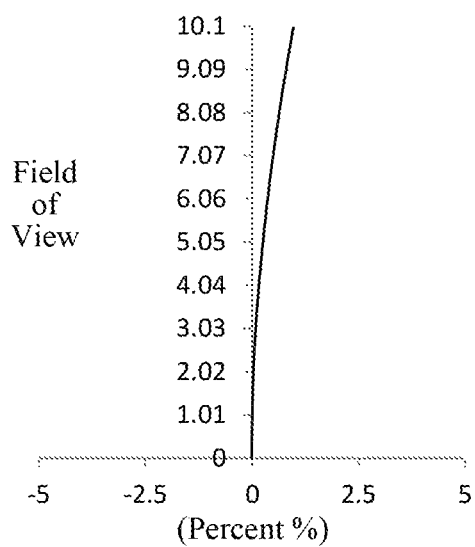
Figure 12D:
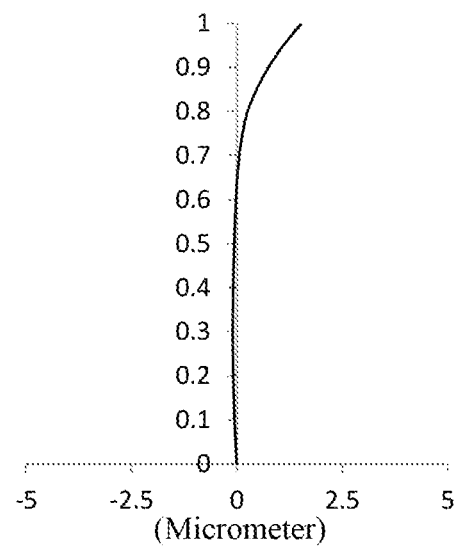

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion at different field-of-views. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve good image quality.

Example 7

Figure 13:
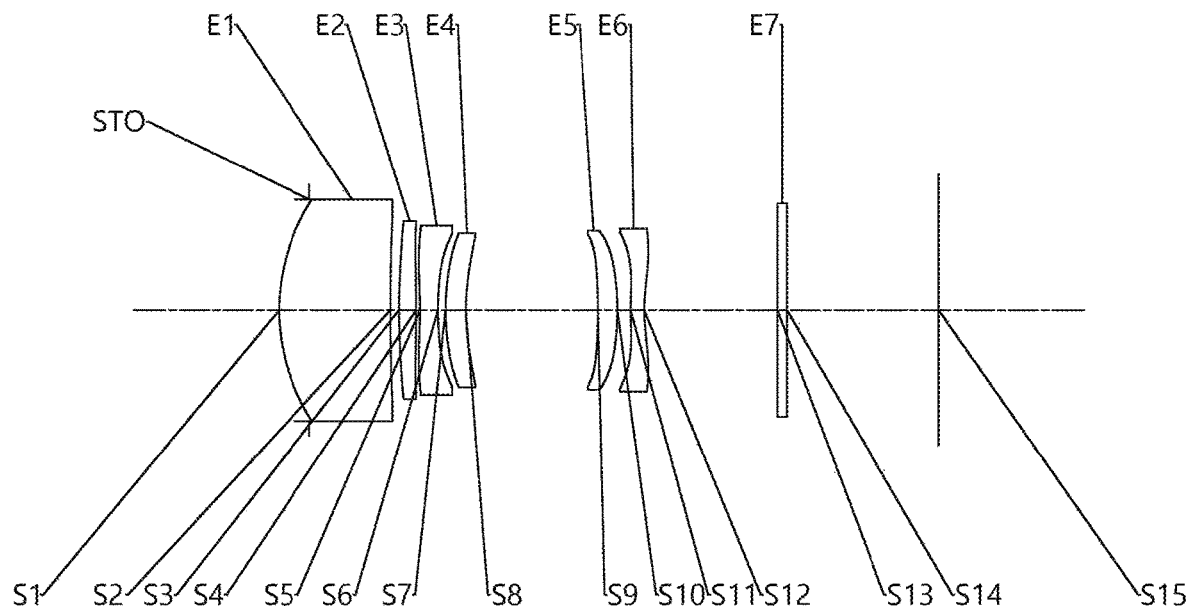
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 7, an effective focal length f of the optical imaging system is 15.37 mm, an on-axis distance TTL from the object-side surface S1 of the first lens E1 to the imaging plane S15 is 13.61 mm, and half of a diagonal length ImgH of an effective pixel area on the imaging plane S15 is 2.77 mm.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Refractive index | Abbe number | Focal length | Conic coefficient |
|---|---|---|---|---|---|---|---|
| OBJ | spherical | infinite | infinite | | | | |
| STO | spherical | infinite | −0.6216 | | | | |
| S1 | aspheric | 4.1022 | 2.3000 | 1.55 | 55.9 | 7.99 | 0.0848 |
| S2 | aspheric | 49.5278 | 0.1769 | | | | 69.0050 |
| S3 | aspheric | 14.2466 | 0.3500 | 1.55 | 55.9 | 19.34 | −72.8646 |
| S4 | aspheric | −41.5071 | 0.0800 | | | | −65.7735 |
| S5 | aspheric | −12.5444 | 0.3729 | 1.65 | 23.5 | −7.65 | 4.4846 |
| S6 | aspheric | 8.2355 | 0.1544 | | | | −0.6847 |
| S7 | aspheric | 4.7835 | 0.4200 | 1.55 | 55.9 | −17652.84 | 0.2135 |
| S8 | aspheric | 4.6322 | 2.7300 | | | | −0.5708 |
| S9 | aspheric | −13.2287 | 0.4007 | 1.67 | 20.4 | 15.34 | 0.5322 |
| S10 | aspheric | −5.8411 | 0.2722 | | | | 0.7447 |
| S11 | aspheric | 6.6878 | 0.2800 | 1.55 | 55.9 | −10.12 | −4.2092 |
| S12 | aspheric | 2.9916 | 2.7422 | | | | −0.1385 |
| S13 | spherical | infinite | 0.2000 | 1.52 | 64.2 | | |
| S14 | spherical | infinite | 3.1307 | | | | |
| S15 | spherical | infinite | | | | | |

TABLE 14

| Surface number | A4 | A6 | A8 | A10 | A12 |
|---|---|---|---|---|---|
| S1 | −5.0000E−04 | −1.9500E−04 | 2.0100E−04 | −1.2000E−04 | 4.3300E−05 |
| S2 | 5.1600E−03 | −2.6100E−02 | 4.5606E−02 | −4.0910E−02 | 2.1134E−02 |
| S3 | 1.7100E−02 | −6.6540E−02 | 1.0690E−01 | −8.6380E−02 | 3.5950E−02 |
| S4 | −1.1400E−03 | −4.4940E−03 | 1.9161E−02 | −1.0100E−02 | −1.0540E−02 |
| S5 | 1.5250E−03 | 7.6486E−02 | −1.2295E−01 | 1.1245E−01 | −6.9000E−02 |
| S6 | 8.6120E−03 | 6.1372E−02 | −7.1570E−02 | 2.5310E−02 | 1.2123E−02 |
| S7 | −1.7620E−02 | 7.9419E−03 | 4.8358E−02 | −1.0903E−01 | 1.0502E−01 |
| S8 | −1.6820E−02 | −7.8350E−03 | 3.4192E−02 | −5.4340E−02 | 4.7669E−02 |
| S9 | 3.7010E−03 | −1.5692E−02 | 1.4793E−02 | −1.9340E−02 | 1.5681E−02 |

TABLE 14-continued

| | | | | | |
|---|---|---|---|---|---|
| S10 | −4.8600E−03 | −3.4800E−03 | 6.6200E−03 | −1.9000E−02 | 1.9966E−02 |
| S11 | −1.4386E−01 | 7.9092E−02 | −2.8250E−02 | −1.4590E−02 | 2.9435E−02 |
| S12 | −1.4663E−01 | 9.0126E−02 | −5.3000E−02 | 2.2991E−02 | −5.0900E−03 |

| Surface number | A14 | A16 | A18 | A20 |
|---|---|---|---|---|
| S1 | −9.8000E−06 | 1.4100E−06 | −1.2000E−07 | 4.5500E−09 |
| S2 | −6.5100E−03 | 1.1790E−03 | −1.2000E−04 | 4.7200E−06 |
| S3 | −6.3500E−03 | −3.2000E−04 | 2.7300E−04 | −2.7000E−05 |
| S4 | 1.4468E−02 | −6.7000E−03 | 1.4160E−03 | −1.2000E−04 |
| S5 | 2.9557E−02 | −8.4700E−03 | 1.4310E−03 | −1.1000E−04 |
| S6 | −1.3130E−02 | 3.9460E−03 | −3.6000E−04 | −1.3000E−05 |
| S7 | −5.3970E−02 | 1.5178E−02 | −2.1500E−03 | 1.1400E−04 |
| S8 | −2.4160E−02 | 6.9860E−03 | −1.0600E−03 | 6.3800E−05 |
| S9 | −7.6100E−03 | 2.1280E−03 | −3.1000E−04 | 1.8900E−05 |
| S10 | −1.1120E−02 | 3.4910E−03 | −5.9000E−04 | 4.1000E−05 |
| S11 | −1.9670E−02 | 6.9550E−03 | −1.2900E−03 | 1.0000E−04 |
| S12 | −5.6000E−04 | 6.7400E−04 | −1.6000E−04 | 1.3900E−05 |

Figure 14A:
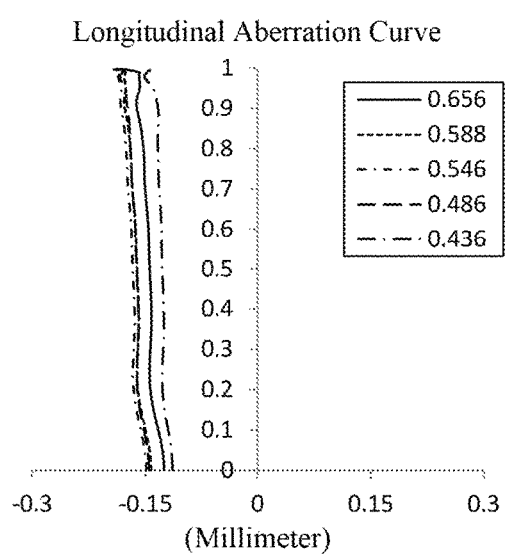
FIGS. 14A to 14D illustrate a longitudinal aberration curve, an astigmatic curve, a distortion curve, and a lateral color curve of the optical imaging system of the Example 7, respectively.
Figure 14B:
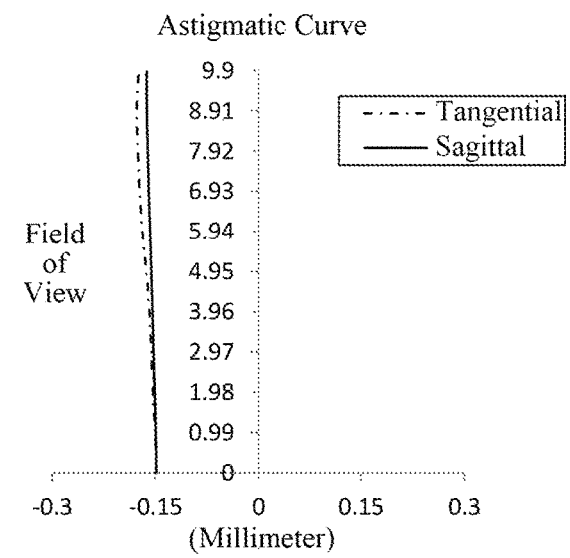
Figure 14C:
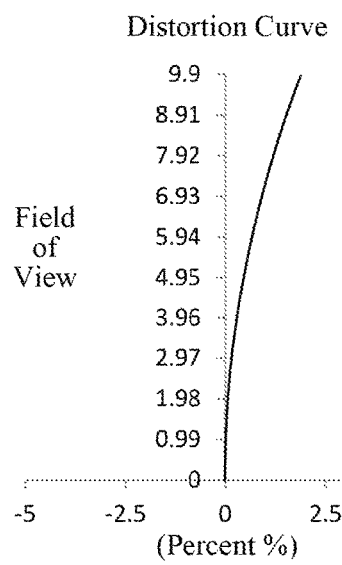
Figure 14D:
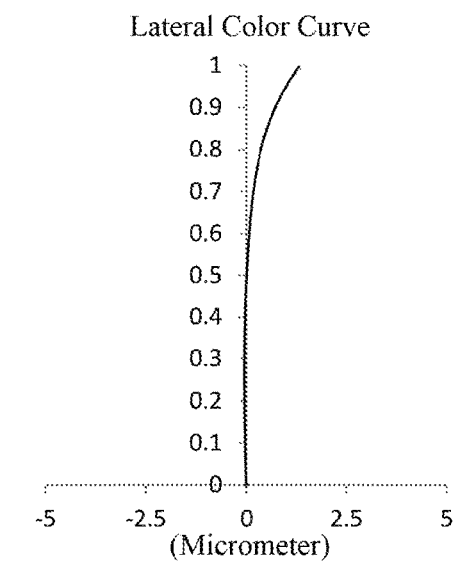

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion at different field-of-views. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve good image quality.

Example 8

Figure 15:
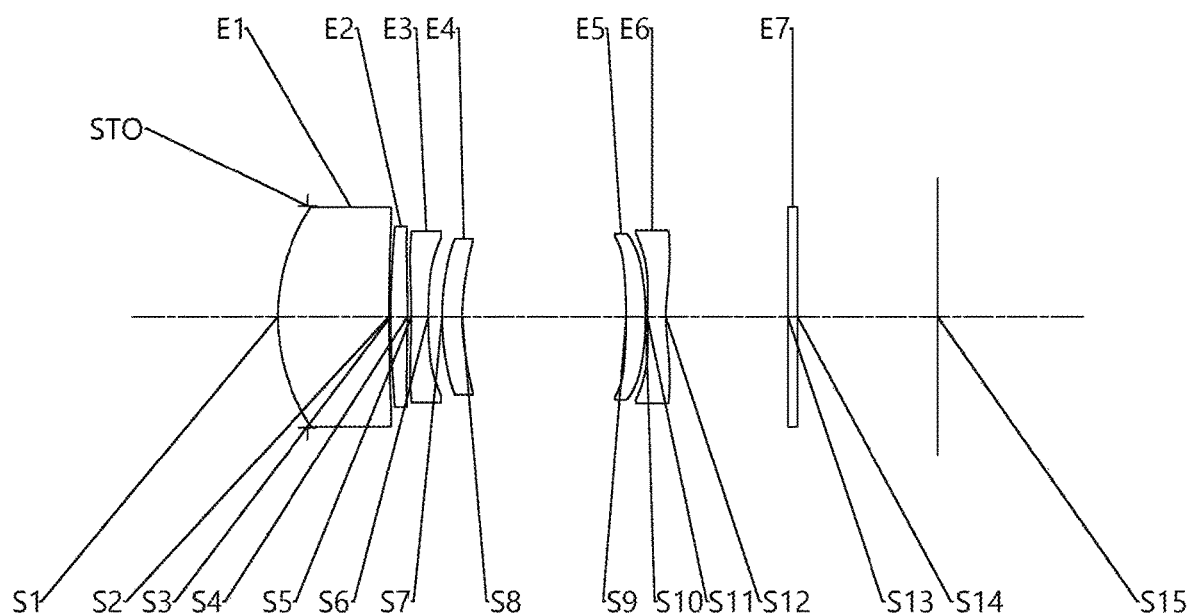
FIG. 15 illustrates a schematic structural view of an optical imaging system according to Example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. The optical imaging system has an imaging plane S15, and light from an object sequentially passes through the respective surfaces S1 to S14 and is finally imaged on the imaging plane S15.

In example 8, an effective focal length f of the optical imaging system is 15.30 mm, an on-axis distance TTL from the object-side surface S1 of the first lens E1 to the imaging plane S15 is 13.62 mm, and half of a diagonal length ImgH of an effective pixel area on the imaging plane S15 is 2.82 mm.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | spherical | infinite | infinite | | | | |
| STO | spherical | infinite | −0.6216 | | | | |
| S1 | aspheric | 4.0238 | 2.3000 | 1.55 | 55.9 | 7.89 | 0.1126 |
| S2 | aspheric | 45.1037 | 0.0300 | | | | 1.1245 |
| S3 | aspheric | 16.4262 | 0.3500 | 1.55 | 55.9 | 20.54 | −63.0421 |
| S4 | aspheric | −35.6850 | 0.0800 | | | | 91.1566 |
| S5 | aspheric | −10.8402 | 0.3461 | 1.65 | 23.5 | −8.78 | 1.5952 |
| S6 | aspheric | 11.9530 | 0.2870 | | | | −0.8413 |
| S7 | aspheric | 5.0578 | 0.4122 | 1.55 | 55.9 | −83.42 | −0.0449 |
| S8 | aspheric | 4.4232 | 3.3901 | | | | −0.2166 |

TABLE 15-continued

| Surface number | Surface type | Radius of curvature | Thickness/ Distance | Material Refractive index | Abbe number | Focal length | Conic coefficient |
|---|---|---|---|---|---|---|---|
| S9 | aspheric | −9.2560 | 0.4000 | 1.67 | 20.4 | −1000.58 | −72.1367 |
| S10 | aspheric | −9.5486 | 0.0300 | | | | 12.5584 |
| S11 | aspheric | 4.1341 | 0.3833 | 1.55 | 55.9 | −30.96 | −9.7554 |
| S12 | aspheric | 3.2160 | 2.5124 | | | | 0.1699 |
| S13 | spherical | infinite | 0.2000 | 1.52 | 64.2 | | |
| S14 | spherical | infinite | 2.8988 | | | | |
| S15 | spherical | infinite | | | | | |

TABLE 16

| Surface number | A4 | A6 | A8 | A10 | A12 |
|---|---|---|---|---|---|
| S1 | −3.3000E−04 | −4.8700E−04 | 5.9400E−04 | −4.1000E−04 | 1.6600E−04 |
| S2 | 8.4390E−03 | −4.7307E−02 | 9.1292E−02 | −8.9630E−02 | 5.0569E−02 |
| S3 | 1.5779E−02 | −6.0749E−02 | 9.7896E−02 | −8.0240E−02 | 3.5067E−02 |
| S4 | 2.4220E−03 | −6.8560E−03 | 4.7800E−03 | 1.4620E−02 | −2.6560E−02 |
| S5 | 4.0250E−03 | 6.2434E−02 | −9.8820E−02 | 8.9931E−02 | −5.5540E−02 |
| S6 | −8.6000E−04 | 1.1686E−01 | −2.0279E−01 | 1.9367E−01 | −1.1562E−01 |
| S7 | −3.2000E−02 | 1.0026E−01 | −1.8311E−01 | 1.9774E−01 | −1.3323E−01 |
| S8 | −2.4900E−02 | 4.2149E−02 | −8.6650E−02 | 1.0807E−01 | −8.3710E−02 |
| S9 | 2.0990E−02 | −7.5365E−02 | 1.8512E−01 | −2.9704E−01 | 2.8488E−01 |
| S10 | −2.0618E−01 | 5.3808E−01 | −7.6033E−01 | 6.2451E−01 | −3.0210E−01 |
| S11 | −4.0737E−01 | 8.2550E−01 | −1.1538E+00 | 1.0223E+00 | −5.7140E−01 |
| S12 | −1.5153E−01 | 1.3387E−01 | −1.2694E−01 | 9.3850E−02 | −4.7590E−02 |

| Surface number | A14 | A16 | A18 | A20 |
|---|---|---|---|---|
| S1 | −4.2000E−05 | 6.5500E−06 | −5.7000E−07 | 2.1200E−08 |
| S2 | −1.7130E−02 | 3.4630E−03 | −3.9000E−04 | 1.8700E−05 |
| S3 | −7.5600E−03 | 4.2600E−04 | 1.0200E−04 | −1.3000E−05 |
| S4 | 1.8916E−02 | −6.8900E−03 | 1.2710E−03 | −9.4000E−05 |
| S5 | 2.4008E−02 | −6.8900E−03 | 1.1550E−03 | −8.4000E−05 |
| S6 | 4.5317E−02 | −1.1700E−02 | 1.8480E−03 | −1.4000E−04 |
| S7 | 5.7762E−02 | −1.5870E−02 | 2.5390E−03 | −1.8000E−04 |
| S8 | 4.1336E−02 | −1.2750E−02 | 2.2490E−03 | −1.7000E−04 |
| S9 | −1.6622E−01 | 5.7749E−02 | −1.0970E−02 | 8.7600E−04 |
| S10 | 7.9175E−02 | −7.5800E−03 | −8.7000E−04 | 1.8300E−04 |
| S11 | 1.9786E−01 | −4.0150E−02 | 4.1720E−03 | −1.5000E−04 |
| S12 | 1.5661E−02 | −3.1600E−03 | 3.5100E−04 | −1.6000E−05 |

Figure 16A:
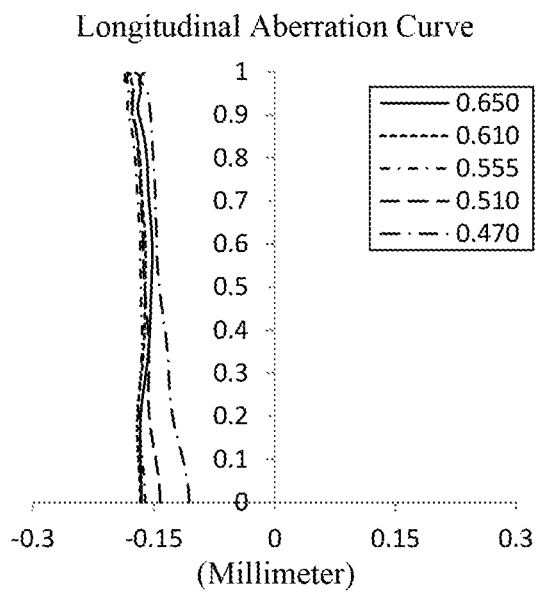
FIGS. 16A to 16D illustrate a longitudinal aberration curve, an astigmatic curve, a distortion curve, and a lateral color curve of the optical imaging system of the Example 8, respectively.
Figure 16B:
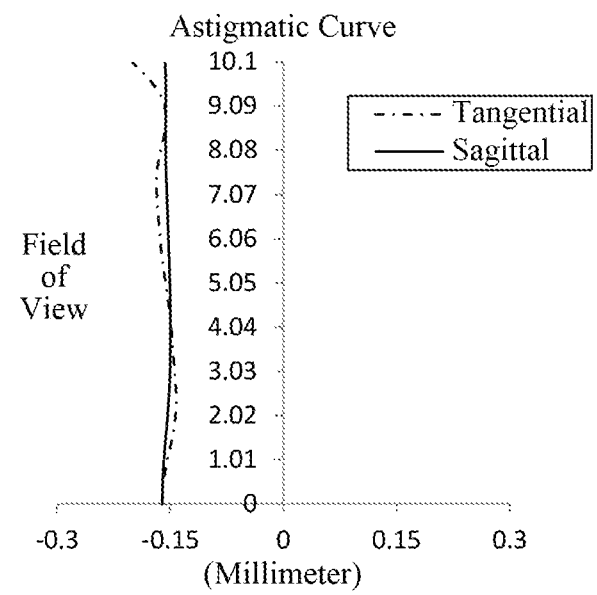
Figure 16C:
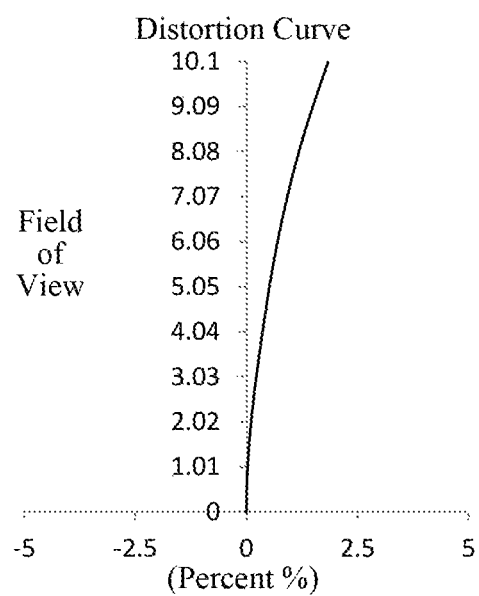
Figure 16D:
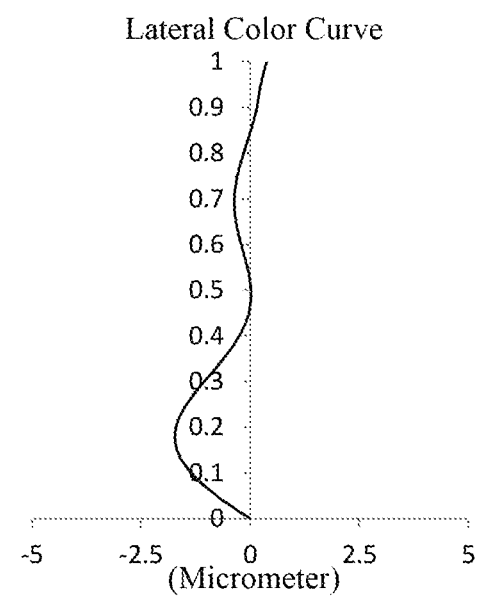

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion at different field-of-views. FIG. 16D illustrates a lateral color curve of the optical imaging system according to example 8, representing deviations of different image heights on an imaging plane after light passes through the optical imaging system. It can be seen from FIG. 16A to FIG. 16D that the optical imaging system provided in example 8 may achieve good image quality.

In view of the above, examples 1 to 8 respectively satisfy the relationship shown in Table 17.

TABLE 17

| Condition | Example 1 | 2 | 3 | 4 | 5 | 6 | 7 | 8 |
|---|---|---|---|---|---|---|---|---|
| Semi-FOV (°) | 9.70 | 9.78 | 9.87 | 9.85 | 10.04 | 10.06 | 9.87 | 10.08 |
| TTL*ImgH/f (mm) | 2.40 | 2.42 | 2.43 | 2.44 | 2.49 | 2.48 | 2.45 | 2.51 |
| TTL (mm) | 13.60 | 13.60 | 13.50 | 13.55 | 13.58 | 13.59 | 13.61 | 13.62 |
| TTL/f | 0.89 | 0.89 | 0.88 | 0.88 | 0.89 | 0.88 | 0.89 | 0.89 |
| f/(f1 − f3) | 1.00 | 1.03 | 1.02 | 1.00 | 1.03 | 1.06 | 0.98 | 0.92 |
| (R11 + R12)/f6 | −0.98 | −0.92 | −1.16 | −0.96 | −1.00 | −1.47 | −0.96 | −0.24 |
| (R7 + R8)/f | 0.55 | 0.55 | 0.55 | 0.54 | 0.57 | 0.55 | 0.61 | 0.62 |
| (R1 + R6)/R3 | 0.64 | 0.63 | 0.66 | 0.61 | 0.64 | 0.34 | 0.87 | 0.97 |
| (CT1 + T45)/TTL*5 | 1.79 | 1.79 | 1.81 | 1.88 | 1.79 | 1.87 | 1.85 | 2.09 |
| (f234 − f56)/f | 1.34 | 1.62 | 1.34 | 1.13 | 1.77 | 1.41 | 1.28 | 1.08 |

TABLE 17-continued

| | Example | | | | | | | |
|---|---|---|---|---|---|---|---|---|
| Condition | 1 | 2 | 3 | 4 | 5 | 6 | 7 | 8 |
| (DT11 + DT61)/ImgH | 1.43 | 1.42 | 1.40 | 1.40 | 1.38 | 1.38 | 1.40 | 1.40 |
| SAG41/SAG61 | −1.64 | −1.63 | −1.41 | −1.67 | −1.77 | −1.25 | −1.29 | −1.15 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
    a first lens having positive refractive power;
    a second lens having refractive power;
    a third lens having negative refractive power;
    a fourth lens having refractive power with a convex object-side surface and a concave image-side surface;
    a fifth lens having refractive power; and
    a sixth lens having negative refractive power,
    wherein Semi-FOV<15°, and
    1.9 mm<TTL*ImgH/f<2.7 mm,
    where Semi-FOV is half of a maximal field-of-view of the optical imaging system, TTL is a distance along the optical axis from an object-side surface of the first lens to an imaging plane of the optical imaging system, ImgH is half of a diagonal length of an effective pixel area on the imaging plane and f is an effective focal length of the optical imaging system, and
    wherein 1.0<(f234−f56)/f<1.8,
    where f234 is a combined focal length of the second lens, the third lens, and the fourth lens; f56 is a combined focal length of the fifth lens and the sixth lens; and f is the effective focal length of the optical imaging system.

2. The optical imaging system according to claim 1, wherein 10 mm<TTL<15 mm,
    where TTL is the distance along the optical axis from the object-side surface of the first lens to the imaging plane of the optical imaging system.

3. The optical imaging system according to claim 1, wherein TTL/f<0.9,
    where TTL is the distance along the optical axis from the object-side surface of the first lens to the imaging plane of the optical imaging system and f is the effective focal length of the optical imaging system.

4. The optical imaging system according to claim 1, wherein 0.8<f/(f1−f3)<1.2, where f is the effective focal length of the optical imaging system, f1 is an effective focal length of the first lens and f3 is an effective focal length of the third lens.

5. The optical imaging system according to claim 1, wherein −1.5<(R11+R12)/f6<−0.2,
    where R11 is a radius of curvature of an object-side surface of the sixth lens, R12 is a radius of curvature of an image-side surface of the sixth lens and f6 is an effective focal length of the sixth lens.

6. The optical imaging system according to claim 1, wherein 0.3<(R1+R6)/R3<1.0,
    where R1 is a radius of curvature of an object-side surface of the first lens, R6 is a radius of curvature of an image-side surface of the third lens and R3 is a radius of curvature of an object-side surface of the second lens.

7. The optical imaging system according to claim 1, wherein 1.7<[(CT1+T45)/TTL]*5<2.2,
    where CT1 is a center thickness of the first lens along the optical axis, T45 is a spaced interval between the fourth lens and the fifth lens along the optical axis and TTL is the distance along the optical axis from the object-side surface of the first lens to the imaging plane of the optical imaging system.

8. The optical imaging system according to claim 1, wherein 1.2<(DT11+DT61)/ImgH<1.5,
    where DT11 is half of an effective aperture of an object-side surface of the first lens, DT61 is half of an effective aperture of an object-side surface of the sixth lens and ImgH is half of the diagonal length of the effective pixel area on the imaging plane of the optical imaging system.

9. The optical imaging system according to claim 1, wherein −1.8<SAG41/SAG61<−1.1,
    where SAG41 is an on-axis distance from an intersection of the object-side surface of the fourth lens and the optical axis to a vertex of an effective radius of the object-side surface of the fourth lens and SAG61 is an on-axis distance from an intersection of an object-side surface of the sixth lens and the optical axis to a vertex of an effective radius of the object-side surface of the sixth lens.

10. An optical imaging system, sequentially from an object side to an image side of the optical imaging system along an optical axis, comprising:
    a first lens having positive refractive power;
    a second lens having refractive power;
    a third lens having negative refractive power;
    a fourth lens having refractive power with a convex object-side surface and a concave image-side surface;
    a fifth lens having refractive power; and
    a sixth lens having negative refractive power,
    wherein Semi-FOV<15°; and
    0.4<(R7+R8)/f<0.8,
    where Semi-FOV is half of a maximal field-of-view of the optical imaging system, R7 is a radius of curvature of the object-side surface of the fourth lens, R8 is a radius of curvature of the image-side surface of the fourth lens and f is an effective focal length of the optical imaging system, and wherein $1.0<(f234-f56)/f<1.8$, where f234 is a combined focal length of the second lens, the third lens, and the fourth lens; f56 is a combined focal length of the fifth lens and the sixth lens; and f is the effective focal length of the optical imaging system.

11. The optical imaging system according to claim 10, wherein 10 mm<TTL<15 mm, where TTL is a distance along the optical axis from an object-side surface of the first lens to an imaging plane of the optical imaging system.

12. The optical imaging system according to claim 10, wherein TTL/f<0.9, where TTL is a distance along the optical axis from an object-side surface of the first lens to an imaging plane of the optical imaging system and f is the effective focal length of the optical imaging system.

13. The optical imaging system according to claim 10, wherein $0.8<f/(f1-f3)<1.2$, where f is the effective focal length of the optical imaging system, f1 is an effective focal length of the first lens and f3 is an effective focal length of the third lens.

14. The optical imaging system according to claim 10, wherein $-1.5<(R11+R12)/f6<-0.2$, where R11 is a radius of curvature of an object-side surface of the sixth lens, R12 is a radius of curvature of an image-side surface of the sixth lens and f6 is an effective focal length of the sixth lens.

15. The optical imaging system according to claim 10, wherein $0.3<(R1+R6)/R3<1.0$, where R1 is a radius of curvature of an object-side surface of the first lens, R6 is a radius of curvature of an image-side surface of the third lens and R3 is a radius of curvature of an object-side surface of the second lens.

16. The optical imaging system according to claim 10, wherein $1.7<[(CT1+T45)/TTL]*5<2.2$, where CT1 is a center thickness of the first lens along the optical axis, T45 is a spaced interval between the fourth lens and the fifth lens along the optical axis and TTL is a distance along the optical axis from an object-side surface of the first lens to an imaging plane of the optical imaging system.

17. The optical imaging system according to claim 10, wherein $1.2<(DT11+DT61)/ImgH<1.5$, where DT11 is half of an effective aperture of an object-side surface of the first lens, DT61 is half of an effective aperture of an object-side surface of the sixth lens and ImgH is half of a diagonal length of an effective pixel area on an imaging plane of the optical imaging system.

18. The optical imaging system according to claim 10, wherein $-1.8<SAG41/SAG61<-1.1$, where SAG41 is an on-axis distance from an intersection of the object-side surface of the fourth lens and the optical axis to a vertex of an effective radius of the object-side surface of the fourth lens and SAG61 is an on-axis distance from an intersection of an object-side surface of the sixth lens and the optical axis to a vertex of an effective radius of the object-side surface of the sixth lens.

* * * * *